US012436555B2

(12) United States Patent
Roh et al.

(10) Patent No.: US 12,436,555 B2
(45) Date of Patent: Oct. 7, 2025

(54) VOLTAGE REGULATOR HAVING CAPACITIVE FEED-FORWARD RIPPLE CANCELLATION CIRCUIT

(71) Applicant: INDUSTRY-UNIVERSITY COOPERATION FOUNDATION HANYANG UNIVERSITY ERICA CAMPUS, Ansan-si (KR)

(72) Inventors: Jeongjin Roh, Ansan-si (KR); Woobin Kang, Ansan-si (KR); Tian Guo, Ansan-si (KR)

(73) Assignee: INDUSTRY-UNIVERSITY COOPERATION FOUNDATION HANYANG UNIVERSITY ERICA CAMPUS, Ansan-si (KR)

( * ) Notice: Subject to any disclaimer, the term of this patent is extended or adjusted under 35 U.S.C. 154(b) by 246 days.

(21) Appl. No.: 18/192,214

(22) Filed: Mar. 29, 2023

(65) Prior Publication Data

US 2023/0393601 A1 Dec. 7, 2023

(30) Foreign Application Priority Data

Jun. 7, 2022 (KR) ........................ 10-2022-0069153

(51) Int. Cl.
*G05F 1/59* (2006.01)
*G05F 1/46* (2006.01)
*G05F 1/565* (2006.01)

(52) U.S. Cl.
CPC ................ *G05F 1/59* (2013.01); *G05F 1/467* (2013.01); *G05F 1/565* (2013.01)

(58) Field of Classification Search
CPC ............. G05F 1/59; G05F 1/467; G05F 1/565
See application file for complete search history.

(56) References Cited

U.S. PATENT DOCUMENTS 9,013,160 B2 * 4/2015 Shih ........................ G05F 1/467 323/273
2003/0111986 A1 6/2003 Xi
(Continued)

FOREIGN PATENT DOCUMENTS

KR 20210132918 A 11/2021

OTHER PUBLICATIONS

El-Nozahi et al., "High PSR Low Drop-Out Regulator With Feed-Forward Ripple Cancellation Technique", 2010, IEEE Journal of Solid-State Circuits, vol. 45, No. 3, pp. 565-577 (Year: 2010).*
(Continued)

*Primary Examiner* — Monica Lewis
*Assistant Examiner* — Lakaisha Jackson
(74) *Attorney, Agent, or Firm* — NKL LAW; Jae Youn Kim

(57) ABSTRACT

Disclosed herein is a voltage regulator having a capacitive feed-forward ripple cancellation circuit, which includes a pass unit configured to transfer, in response to a control signal, an input voltage provided from an input terminal to an output voltage of an output terminal, an error amplification unit configured to output a comparison signal on the basis of a magnitude comparison result between the output voltage and a reference voltage, and a capacitive feed-forward ripple cancellation unit configured to remove a ripple included in the input voltage using the reference voltage and the comparison signal in order to generate the control signal. In accordance with the present invention, a circuit capable of removing power supply noise while consuming a low quiescent current through a capacitive feed-forward ripple cancellation technique can be provided.

6 Claims, 27 Drawing Sheets

(56) References Cited

U.S. PATENT DOCUMENTS

| | | | | |
|---|---|---|---|---|
| 2013/0033244 | A1* | 2/2013 | Ock | G05F 1/56 323/280 |
| 2016/0195883 | A1* | 7/2016 | Aboudina | G05F 1/575 323/280 |
| 2023/0266783 | A1* | 8/2023 | Deng | G05F 1/467 323/280 |

OTHER PUBLICATIONS

Hamidreza Rezaee Dehsorkh, et al., A linear tunable amplifier for implantable neural recording applications, Conference Paper in Midwest Symposium on Circuits and Systems, Aug. 2011.
Mohamed El-Nozahi, et al., High PSR Low Drop-Out Regulator With Feed-Forward Ripple Cancellation Technique, IEEE Journal of Solid-State Circuits, vol. 45, No. 3, Mar. 2010.
Tian Guo, et al., A 0.9-μA Quiescent Current High PSRR Low Drop-Out Regulator Using a Capacitive Feed-Forward Ripple Cancellation Technique, IEEE Journal of Solid-State Circuits, vol. 57, issue 10, pp. 3139-3149.

* cited by examiner

PSRR at $I_L$ = 10 mA

PSRR at $I_L$ = 200 mA

Simulated frequency response at $I_L = 10\ \mu A$, $100\ \mu A$, 1 mA.

Simulated frequency response at $I_L$ = 10 mA, 50 mA, 100 mA, 200 mA.

Simulated frequency response at 10 mA load current with and without the SA.

Simulated frequency response at 10 mA load current with different parasitic components.

Input ripple of 1 kHz.

Input ripple of 1 MHz.

Measured load transient response with a load current step of 200 mA.

Measured line transient response at a load current of 200 mA.

$I_L$ = 10 $\mu$A, 100 $\mu$A.

$I_L$ = 1 mA, 10 mA, 50 mA.

$I_L$ = 100 mA, 200 mA.

$I_L$ = 200 mA with and without the proposed PSRR enhancer.

VOLTAGE REGULATOR HAVING CAPACITIVE FEED-FORWARD RIPPLE CANCELLATION CIRCUIT

CROSS-REFERENCE TO RELATED APPLICATION

This application claims priority to and the benefit of Korean Patent Application No. 10-2022-0069153, filed on Jun. 7, 2022, the disclosure of which is incorporated herein by reference in its entirety.

BACKGROUND

1. Field of the Invention

The present invention relates to a voltage regulator having a capacitive feed-forward ripple cancellation circuit, and more particularly, to a voltage regulator having a feed-forward ripple cancellation circuit using a capacitor instead of a resistor.

2. Discussion of Related Art

Recently, with the increase in bandwidth of analog circuits and radio frequency (RF) circuits, low-dropout regulators (LDOs) have come to require high power supply rejection ratio (PSRR) performance at high frequencies.

FIG. 1 shows a structure of a typical LDO. In the case of the typical LDO as shown in drawing, it is difficult to expect a high PSRR at high frequencies due to a low DC gain and a limited bandwidth. Thus, a resistive feed-forward ripple cancellation (FFRC) technique can be used. This technique can generate a stable output signal by offsetting power supply noise through a feed-forward path without amplifying the power supply noise. However, since a resistor is being used, there is a limitation that power consumption of a circuit cannot be minimized because a bias current continuously flows.

Meanwhile, in the related art, attempts have been made to improve a PSRR using a low quiescent current. However, even in this case, there is a limitation in using a quiescent current that is smaller than a 1 μA current.

FIG. 2 shows a structure of a typical LDO to which the existing resistive feed-forward ripple cancellation (FFRC) is applied. As shown in FIG. 2, power supply noise is output through three paths, Path 1, Path 2, and Path 3. An output voltage due to the power supply noise can be expressed as follows.

[Equation 1]

$$V_{OUT}(s) \cong \frac{1}{1+T(s)} \times Z_{LOAD} \times \left[i_{d,EA}(s) + i_{d,Cgs}(s) + i_{d,R_{DSP}C_{DB}}(s)\right]$$

In Equation 1, $i_{d,EA}(s)$, $i_{d,Cgs}(s)$, and $i_{d,RDSPCDB}(s)$ denote the three paths through which the power supply noise flows, and EA, $C_{gs}$, and $R_{DSP}C_{DB}$ denote an error amplifier EA, a gate-source parasitic capacitor $C_{gs}$ of a pass transistor $M_P$, and output impedance $R_{DSP}C_{DB}$ of the pass transistor $M_P$, respectively. T(s) denotes an open loop transfer function of the LDO, and a DC gain of the LDO determines the overall PSRR performance. In addition, a dominant pole of the transfer function T(s) may become zero on a PSRR curve, and the PSRR performance starts to decrease at the dominant pole of zero. That is, the dominant pole limits a unity gain bandwidth (UGB) of the LDO and degrades the PSRR performance at high frequencies.

FIG. 3 shows a structure of resistive FFRC. In FIG. 3, DC gains of a feed-forward amplifier FFA and a summing amplifier SA are $R_{ff2}/R_{ff1}=1$ and $R_{S2}/R_{S1}=1$, respectively. In the resistive FFRC, since bias currents continuously flow through the resistors $R_{ff1}$, $R_{ff2}$, $R_{S1}$, and $R_{S2}$, there is a limitation in designing the feed-forward amplifier FFA and the summing amplifier SA with low power.

[Equation 2]

$$V_{bias,min} = V_{DD,max} \times \frac{R_{ff2}}{R_{ff1}+R_{ff2}} + V_{B,min}$$

In Equation 2, $V_{B,min}$ is a minimum value of an output voltage of the feed-forward amplifier FFA. A value of a bias voltage is different from a value of a reference voltage $V_{REF}$. This means that an extra bias voltage, an extra circuit, and quiescent current consumption are required. $V_{bias,min}$ (bias voltage) should be considered an input range of a power supply and an output headroom of the feed-forward amplifier FFA. As can be seen in FIG. 3, a bias voltage at a positive (+) input of the feed-forward amplifier FFA is connected to an output terminal $V_{out}$ of the LDO. An output voltage is 1 V, and a maximum input supply voltage is limited to 2 V. However, an output range of the feed-forward amplifier FFA is not considered. A ratio of $R_{ff2}$ to $R_{ff1}$ is 1. When an input supply voltage increases to 2 V due to a 1 V bias voltage, an output voltage of the feed-forward amplifier FFA decreases to 0 V. Therefore, an FFRC circuit cannot be biased in an appropriate operating state.

In addition, an error amplifier EA used in the drawings has a narrow output swing. In order to limit a swing at a node C to be similar to an output swing of the error amplifier EA, a resistor $R_{S3}$ is used to reduce a voltage fluctuation at the node C. In addition, a gate voltage of the pass transistor $M_P$ is limited due to resistors $R_{S1}$ to $R_{S3}$. For example, even when a large pass transistor of 2.4 mm/0.13 μm is used, a maximum load current is limited to a 25 mA current.

As described above, a low-power LDO has a quiescent current of 1 μA or less. In order to reduce a quiescent current of a circuit, there should be no wasted current or a wasted current should be reduced to a minimum. In the resistive FFRC technique, since the bias currents continuously flow through the resistors $R_{ff1}$, $R_{ff2}$, $R_{S1}$, and $R_{S2}$, a quiescent current of at least 1 μA should flow in the LDO including the FFRC. When an appropriate quiescent current is not secured, performance degradation problems such as system instability and bandwidth reduction occur. Therefore, the resistive FFRC technique has limitations in low-power design.

SUMMARY OF THE INVENTION

The present invention is directed to providing a circuit capable of removing power supply noise using a low quiescent current through a capacitive feed-forward ripple cancellation (FFRC) technique.

According to an aspect of the present invention, there is provided a voltage regulator including a pass unit configured to transfer, in response to a control signal, an input voltage provided from an input terminal to an output voltage of an output terminal, an error amplification unit configured to output a comparison signal on the basis of a magnitude comparison result between the output voltage and a reference voltage, and a feed-forward ripple cancellation unit configured to remove a ripple included in the input voltage using the reference voltage and the comparison signal in order to generate the control signal.

The feed-forward ripple cancellation unit may include a feed-forward amplifier and a summing amplifier.

The feed-forward ripple cancellation unit may include a first capacitor having one end connected to the input terminal and the other end connected to a negative input terminal of the feed-forward amplifier, a second capacitor having one end connected to the negative input terminal of the feed-forward amplifier and the other end connected to an output terminal of the feed-forward amplifier, a third capacitor having one end connected to the output terminal of the feed-forward amplifier and the other end connected to the negative input terminal of the summing amplifier, and a fourth capacitor having one end connected to a negative input terminal of the summing amplifier and the other end connected to an output terminal of the summing amplifier.

The feed-forward ripple cancellation unit may include a first resistor connected to the second capacitor in parallel between the negative input terminal of the feed-forward amplifier and the output terminal of the feed-forward amplifier, and a second resistor connected to the fourth capacitor in parallel between the negative input terminal of the summing amplifier and the output terminal of the summing amplifier.

A positive input terminal of the feed-forward amplifier may be connected to a negative input terminal of the error amplification unit.

A positive input terminal of the summing amplifier may be connected to an output terminal of the error amplification unit.

At least one of the first resistor and the second resistor may be a pseudo-resistor.

The pseudo-resistor may include the first transistor and the second transistor, a drain of the first transistor and a drain of the second transistor may be connected to each other through a common node, and a gate of the first transistor and a gate of the second transistor may be connected to each other through the common node.

BRIEF DESCRIPTION OF THE DRAWINGS

The above and other objects, features and advantages of the present invention will become more apparent to those skilled in the art by describing exemplary embodiments thereof in detail with reference to the accompanying drawings, in which:

FIGS. 18A-18B are diagrams illustrating load transient responses and line transient responses measured according to an embodiment of the present invention, wherein FIG. 18A shows a load transient response measured at a load current step of 200 mA, and FIG. 18B shows a line transient response measured at a load current of 200 mA.

FIGS. 19A-19D are diagrams illustrating PSRR measured in various conditions according to an embodiment of the present invention, wherein FIG. 19A shows PSRR at $I_L$=10 μA and 100 μA, FIG. 19B shows PSRR at $I_L$=1 mA, 10 mA, and 50 mA, FIG. 19C shows PSRR at $I_L$=100 mA, and 200 mA, and FIG. 19D shows PSRR at $I_L$=200 mA with and without a proposal PSRR enhancer.

DETAILED DESCRIPTION OF EXEMPLARY EMBODIMENTS

Figure 1:
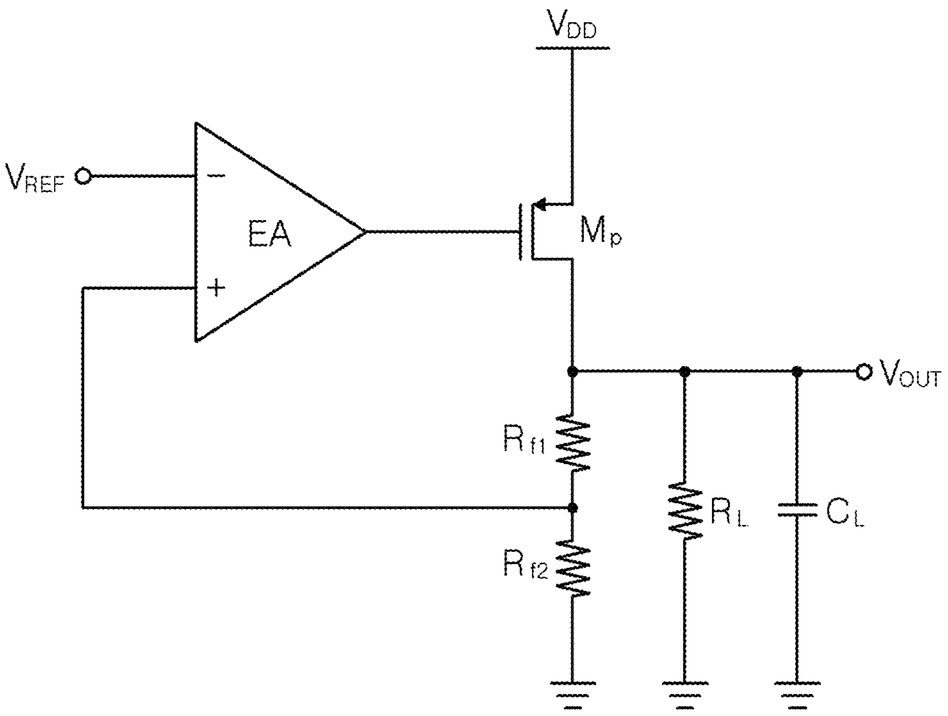
FIG. 1 Prior Art
FIG. 1 is a diagram illustrating a structure of a typical low-dropout regulator (LDO)
Figure 2:
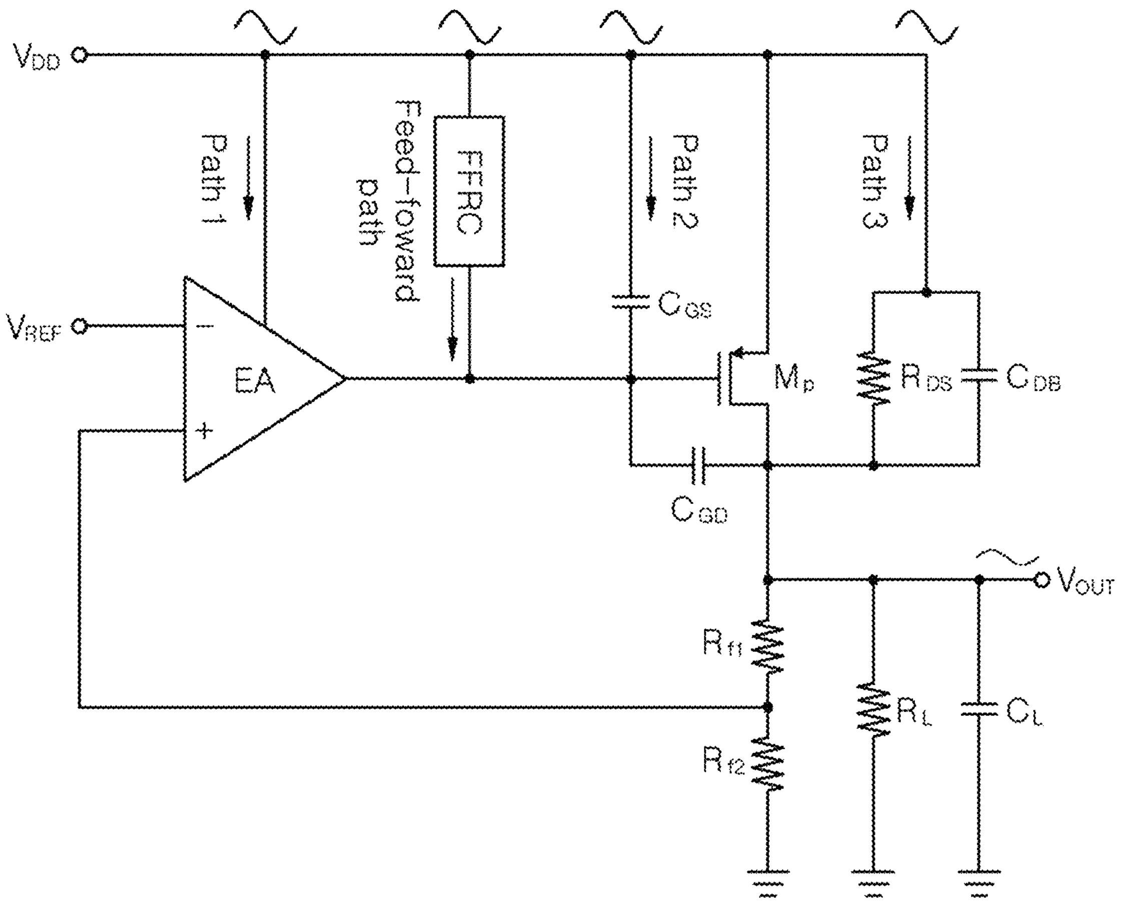
FIG. 2 Prior Art
FIG. 2 is a diagram illustrating a structure of a typical LDO to which the existing resistive feed-forward ripple cancellation (FFRC) is applied.

Hereinafter, the most exemplary embodiment of the present invention will be described. In the drawings, thicknesses and intervals are expressed for convenience of description and may be exaggerated compared to actual physical thicknesses. In describing the present invention, known configurations irrelevant to the gist of the present invention may be omitted. In giving reference numerals to components of the drawings, the same reference numerals are given to the same components even when the same components are shown in different drawings.

The above and other objectives, features, and advantages of the present invention will become more apparent from the following description of exemplary embodiments with reference to the accompanying drawings. However, the present invention is not limited to the embodiments disclosed herein and may be implemented in other forms. Rather, the embodiments disclosed herein are provided so that the disclosed content can be more thorough and complete and the spirit of the present invention can be sufficiently conveyed to those skilled in the art, without any intention other than to provide convenience of understanding.

In the present specification, when it is mentioned that certain elements or lines are connected to a target element block, it includes not only a direct connection but also an indirect connection to the target element block through some other elements.

In addition, the same or similar reference numerals presented in each drawing denote the same or similar components where possible. In some drawings, connection relationships between elements and lines are only shown for effective description of technical content, and other elements or circuit blocks can be further provided.

Each embodiment described and illustrated herein may also include a complementary embodiment thereof, and it is noted that a general operation of voltage regulation in a low dropout type and details of circuits or devices for performing the general operation are not described in detail so as not to obscure the gist of the present invention.

In a circuit according to an embodiment of the present invention, a capacitive feed-forward ripple cancellation (CFFRC) technique is proposed. Unlike the existing techniques, the technique to be proposed in the present invention includes a capacitor instead of a resistor. Therefore, the technique solves a problem in that a quiescent current increases due to a bias current. In addition, the bias voltage is defined by a back-to-back pseudo-resistor.

The CFFRC technique according to an embodiment of the present invention is used to improve power supply rejection ratio (PSRR) performance of a low-dropout regulator (LDO). A CFFRC circuit of the present invention removes power supply noise through a feed-forward path. In the existing resistive FFRC, there is a limitation in low-power design due to a bias current. However, as a result of applying capacitive FFRC, low-power design is possible because there is no power consumption due to a bias current.

Figure 3:
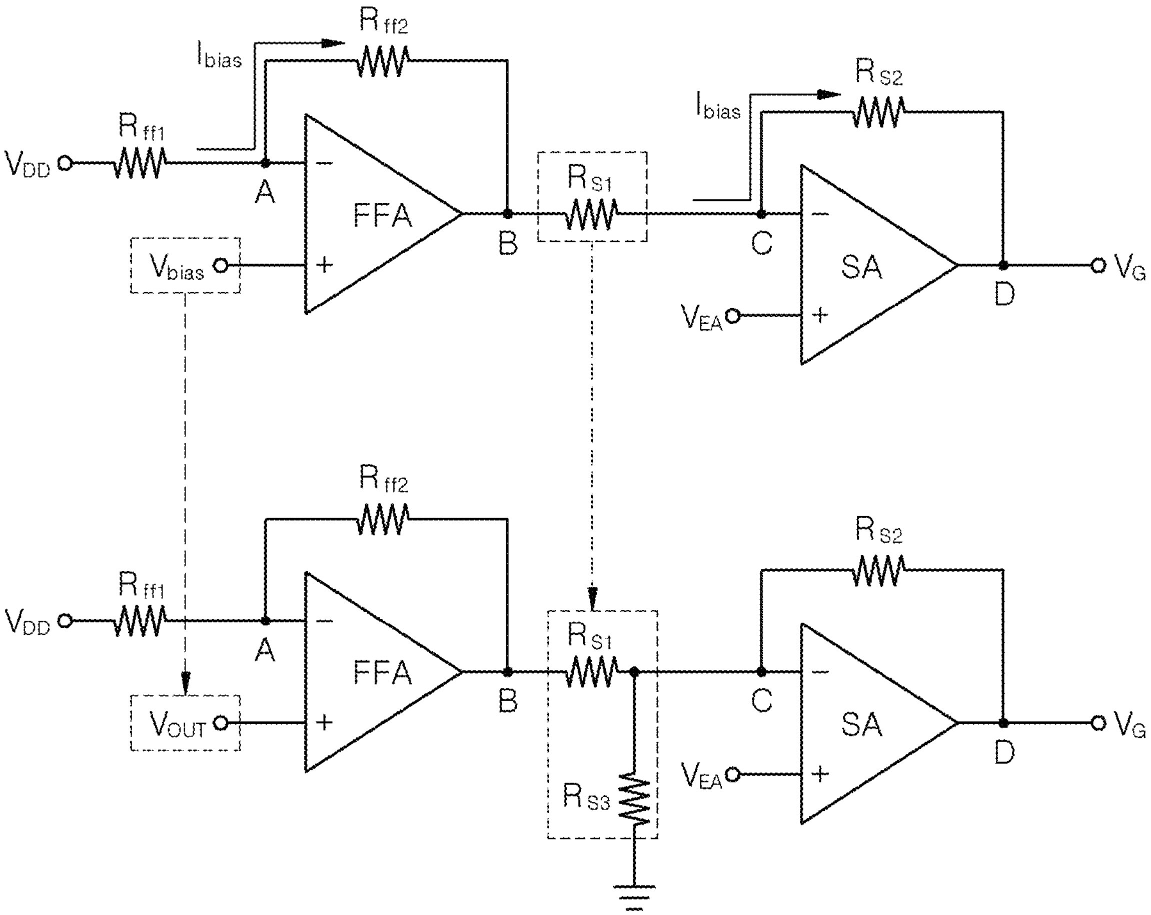
FIG. 3 Prior Art
FIG. 3 is a diagram illustrating a structure of resistive FFRC applied to FIG. 2.
Figure 4:
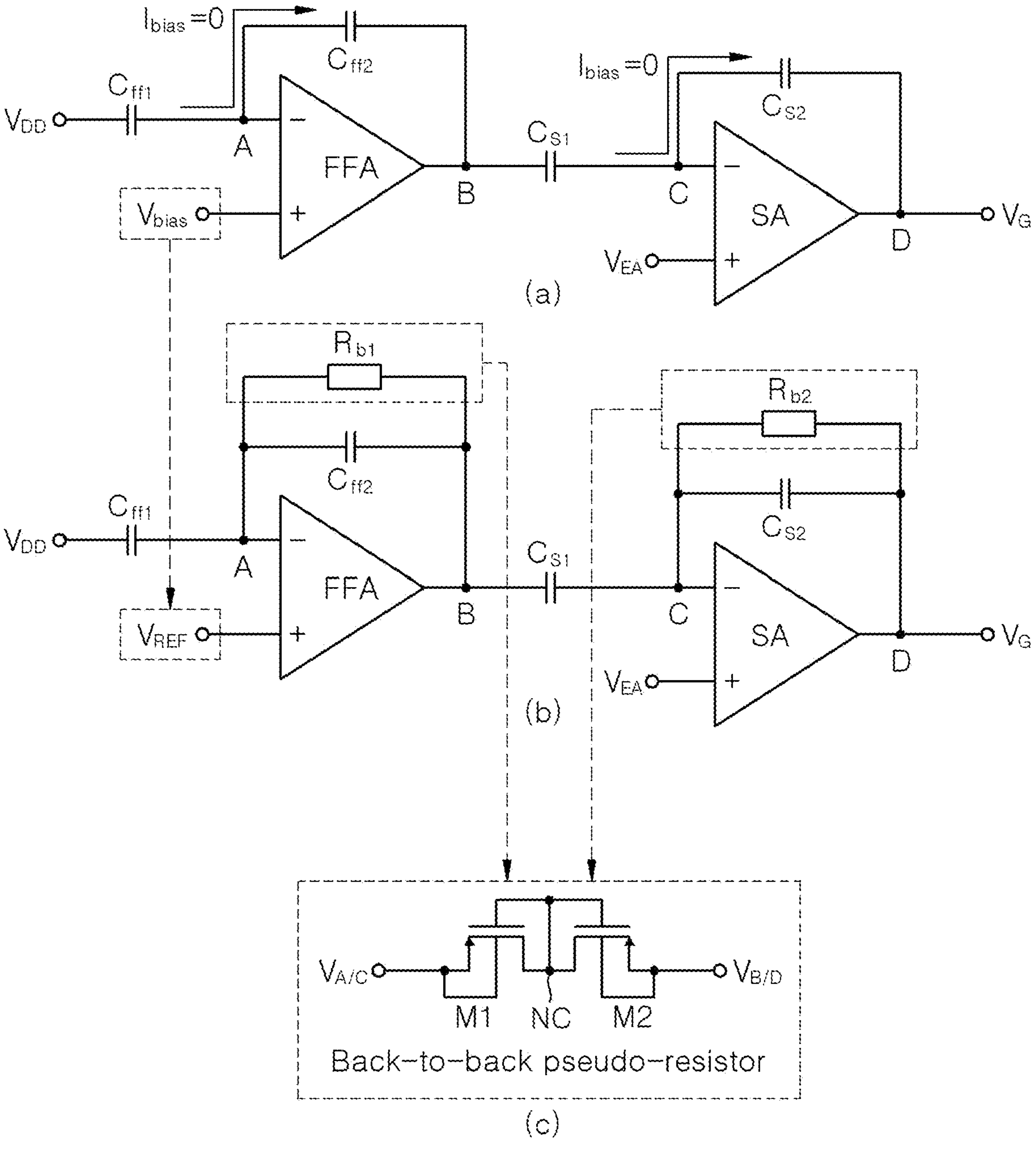
FIG. 4 is a diagram illustrating a capacitive feed-forward ripple cancellation (CFFRC) circuit including capacitors and a back-to-back pseudo-resistor according to an embodiment of the present invention.

FIG. 4 is a diagram illustrating a CFFRC circuit including capacitors and a back-to-back pseudo-resistor according to an embodiment of the present invention. Referring to FIG. 4, in order to solve the above-described power consumption problem in FIG. 3, capacitors $C_{ff1}$, $C_{ff2}$, $C_{S1}$, and $C_{S2}$ are applied instead of the resistors $R_{ff1}$, $R_{ff2}$, $R_{S1}$, and $R_{S2}$ (see FIG. 4A). Reference will be made in the order of a first capacitor $C_{ff1}$, a second capacitor $C_{ff2}$, a third capacitor $C_{S1}$, and a fourth capacitor $C_{S2}$. In this case, since a DC bias point cannot be defined when only the capacitors are applied, a first resistor $R_{b1}$ and a second resistor $R_{b2}$ are applied in order to define the DC bias point (see FIG. 4B). In addition, a back-to-back pseudo-resistor is used as the first resistor $R_{b1}$ and the second resistor $R_{b2}$ so that a resistor with a resistance of hundreds of gigaohms is implemented in a small area (see FIG. 4C).

As shown in the drawing, a first transistor M1 and a second transistor M2 constitute the back-to-back pseudo-resistor. Each transistor operates as a reverse-biased PN junction transistor or a diode-connected metal-oxide-silicon (MOS) transistor. This structure is easy to implement, has a low parasitic capacity, and hardly adds noise to an amplifier. The back-to-back pseudo-resistor may be designed with an aspect ratio of, for example, 220 nm/180 nm. Equivalent resistance of the back-to-back pseudo-resistor is a maximum of hundreds of gigaohms. Thus, only a few picoamperes flow through a feed-forward path. Power consumption of a CFFRC block occurs only in a feed-forward amplifier and a summing amplifier. In the case of amplifier design, a transistor can be operated in an area of a threshold value or less to achieve a low quiescent current. In order to drive a large load current and obtain a quicker response, a buffer with an adaptive bias is appropriately chosen. As a result, since there is no resistance load, it is easier to achieve low power consumption.

As shown in the drawing, the first transistor M1 and the second transistor M2 may be connected to form the back-to-back pseudo-resistor. Specifically, one terminal (for example, a drain) of the first transistor M1 of the back-to-back pseudo-resistor and one terminal (for example, a drain) of the second transistor M2 of the back-to-back pseudo-resistor may be connected to each other through a common terminal NC. In addition, both gates of the first transistor M1 and the second transistor M2 may be connected to each other through the common terminal NC. A body of each transistor may be connected to a source of each transistor. In this case, the other terminal (for example, a source) of the first transistor M1 may be connected to negative input terminals of the feed-forward amplifier FFA and the summing amplifier SA. In addition, the other terminal (for example, a source) of the second transistor M2 may be connected to output terminals of the feed-forward amplifier FFA and the summing amplifier SA.

In the drawing, a DC voltage between a first node A and a second node B is determined by the first resistor $R_{b1}$, and a DC voltage between a third node C and a fourth node D is determined by the second resistor $R_{b2}$. Therefore, an additional circuit for a bias voltage is not required.

$$V_A = V_B = V_{REF} \quad \text{[Equation 3]}$$

$$V_C = V_D = V_{EA} \quad \text{[Equation 4]}$$

That is, an extra bias voltage (additional bias voltage) is no longer necessary, and a DC current does not flow through the above path. In addition, there is no limitation in input and output swings of the feed-forward amplifier FFA and the summing amplifier SA.

Figure 5A:
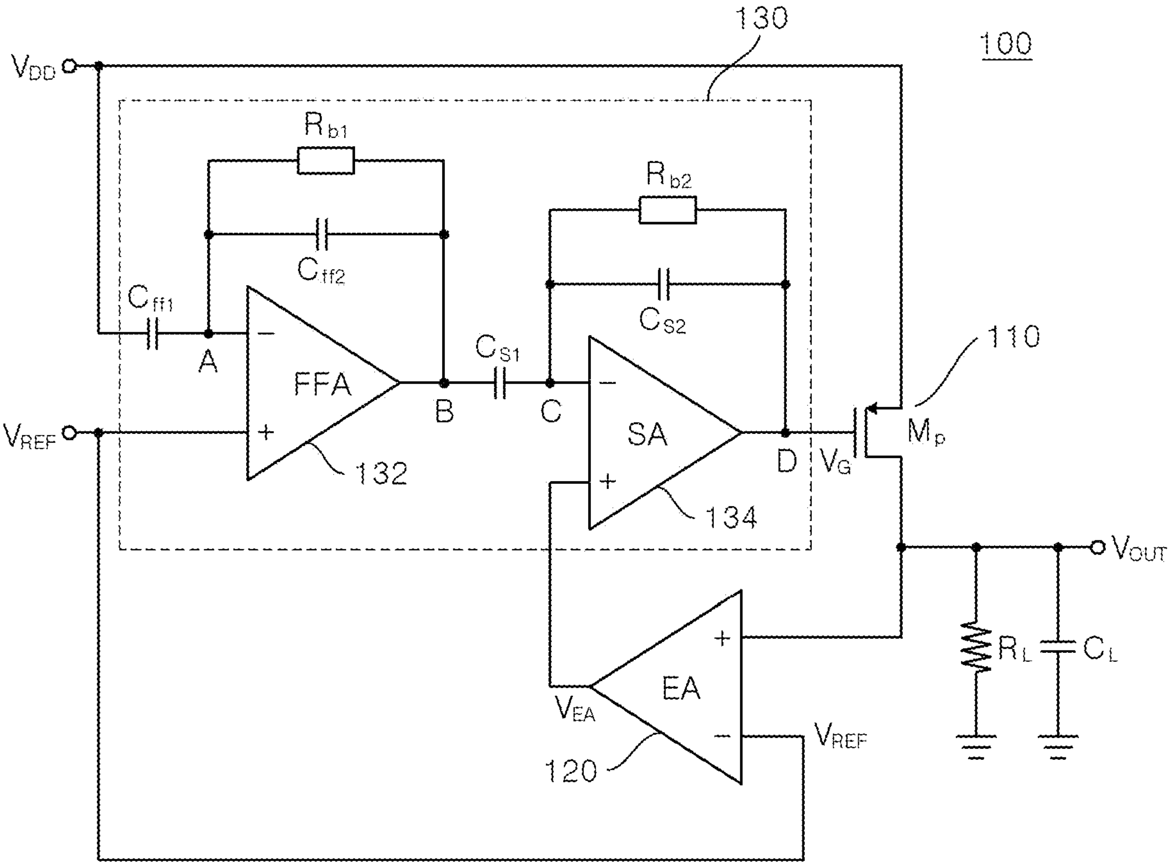
FIG. 5A is a block diagram illustrating the CFFRC circuit according to an embodiment of the present invention.
Figure 5B:
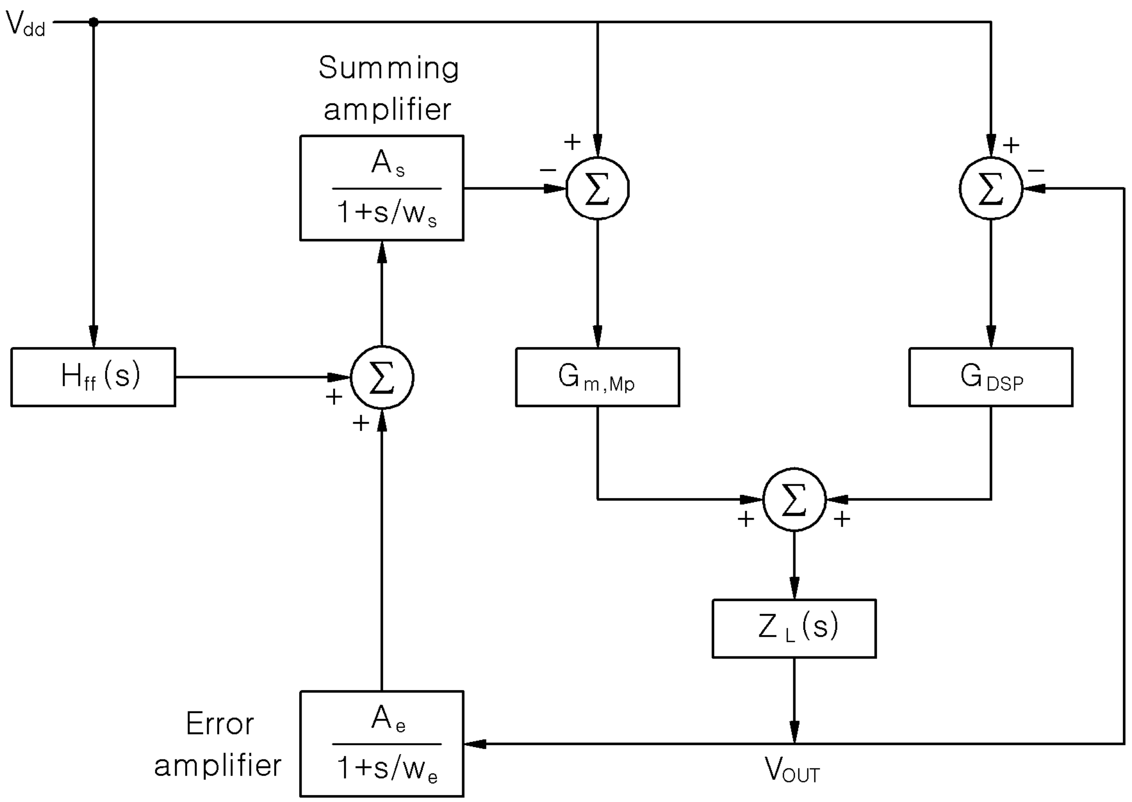
FIG. 5B is a diagram illustrating a mathematical model of FIG. 5A.

FIG. 5A is a block diagram illustrating the CFFRC circuit according to an embodiment of the present invention. In addition, FIG. 5B shows a mathematical model of FIG. 5A. A transfer function from an output of a circuit shown in FIG. 5A to a power supply may be expressed as follows.

$$\frac{V_{OUT}}{V_{DD}}(s) = \frac{1 + G_{m,Mp}R_{DSP}\left[1 - H_{ff}(s)\frac{A_s}{1 + \frac{s}{\omega_s}}\right]}{1 + \frac{R_{DSP}}{Z_L(s)} + \frac{G_{m,Mp}R_{DSP}A_eA_s}{\left(1 + \frac{s}{\omega_s}\right)\left(1 + \frac{s}{\omega_e}\right)}} \quad \text{[Equation 5]}$$

In Equation 5, the feed-forward amplifier FFA and the summing amplifier SA operate as high-pass filters, and $A_s$ denotes a low-frequency gain of the summing amplifier SA above a cutoff frequency. $H_{ff}(s)$ denotes a transfer function of the feed-forward cancellation block, Ae denotes a DC gain of the error amplifier EA, and $\omega_e$ and $\omega_s$ are dominant poles of the error amplifier EA and the summing amplifier SA, respectively. $G_{m,Mp}$ and $R_{DSP}$ denote transconductance and output impedance of the pass transistor $M_p$, respectively. $Z_L(s)$ denotes load impedance. When a numerator in Equation 5 becomes zero, PSRR is significantly improved. Therefore, the transfer function $H_{ff}(s)$ may be expressed as follows.

$$H_{ff}(s) = \frac{1+\frac{s}{\omega_s}}{A_s} \times \left(1 + \frac{1}{G_{m,Mp}R_{DSP}}\right) \quad \text{[Equation 6]}$$

Figure 6:
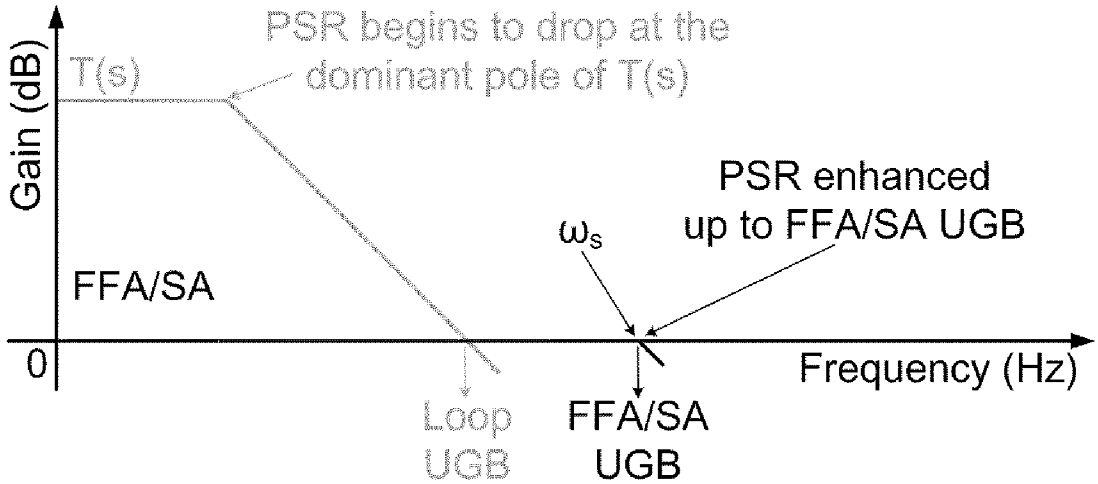
FIG. 6 is a diagram illustrating a relationship between a unity gain bandwidth (UGB) of the LDO and feed-forward amplifier (FFA) over summing amplifier (SA) according to an embodiment of the present invention.

Generally, since $G_{m,Mp}R_{DSP}>>1$, the DC gain of the feed-forward amplifier FFA is substantially equal to a reciprocal of the DC gain of the summing amplifier SA having a coefficient of 1 in Equation 6. In Equation 6, $R_D$SP decreases, and $G_{m,MP}$ increases as a load current increases. Ideally, in order to satisfy Equation 6, the coefficient should be changed according to a change of the load current. Since it is difficult for most LDOs using the FFRC technique to follow optimal coefficient values, most LDOs have fixed coefficient values. Although the fixed coefficient is not the most optimal value for all load conditions, the PSRR is effectively improved for various load conditions. In addition, in Equation 6, $\omega_s$ is expected to become a zero point in order to cancel a pole of the summing amplifier SA, but this pole is positioned out of a UGB of the LDO as shown in FIG. 6. PSRR enhancement is effectively achieved up to UGBs of the summing amplifier SA and the feed-forward amplifier FFA. In order to implement a zero point at $\omega_s$, a bandwidth of the feed-forward amplifier FFA should be significantly higher than that of the summing amplifier SA. However, for bandwidth expansion, power consumption should be increased. Therefore, the zero point is not implemented in this design. Capacitance of each of the capacitors $C_{ff1}$, $C_{ff2}$, $C_{S1}$, and $C_{S2}$ used in the feed-forward paths may be set to, for example, 1 pF. As shown in FIG. 5A, transfer functions of the feed-forward amplifier FFA and the summing amplifier SA may be expressed as follows.

$$H_{ff}(s) \approx \frac{C_{ff1}}{C_{ff2}} \approx 1,\ H_{sa}(s) \approx \frac{C_{s1}}{C_{s2}} \approx 1 \quad \text{[Equation 7]}$$

That is, the UGBs of the feed-forward amplifier FFA and the summing amplifier SA are positioned at a higher frequency than the UGB of the LDO. Therefore, the PSRR is effectively improved up to the UGBs of the feed-forward amplifier FFA and the summing amplifier SA. It can be seen that $C_{ff1}$, $C_{ff2}$, $C_{S1}$, and $C_{S2}$ each have 1 pF capacitance, so the transfer functions of the feed-forward amplifier FFA and the summing amplifier SA become 1. A gain of the amplifier is increased, and transfer functions of $C_{ff1}/C_{ff2}$ and $C_{S1}/C_{S2}$ are respectively set to 1 so that the gain is simplified to a capacitor ratio. In order to increase the gain of the amplifier, a two-stage amplifier is applied.

Figure 7A:
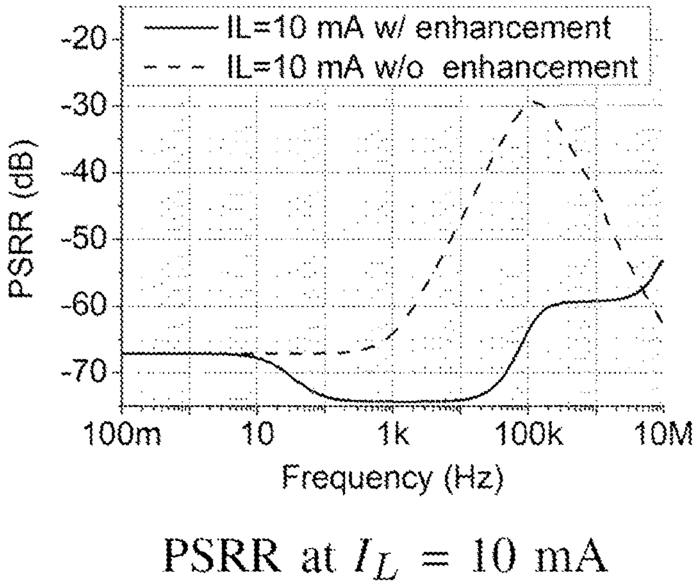
FIGS. 7A-7B are diagrams illustrating simulation results of the PSRR with and without the CFFRC at a light load and a heavy load according to an embodiment of the present invention.
Figure 7B:
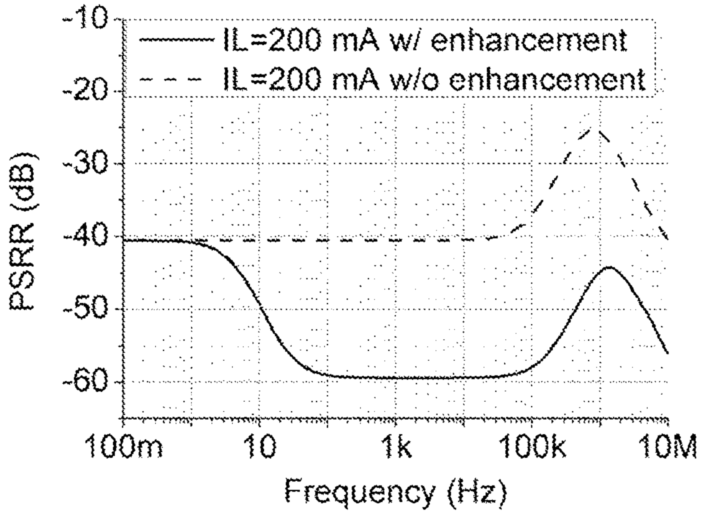

In Equation 7, the same gain of the feed-forward amplifier FFA and the summing amplifier SA is achieved with a coefficient of 1. It is shown that finite PSRRs of the summing amplifier SA and the feed-forward amplifier FFA do not significantly affect the PSRR of the LDO. Therefore, this effect may be neglected during the PSRR analysis of the system. The feed-forward coefficient is secured by a sufficiently high open-loop gain of the amplifier. The feed-forward amplifier FFA and the summing amplifier SA are each formed of a feedback circuit and should each have a closed-loop gain of 0 dB above the UGB of the LDO as shown in FIG. 6. For example, the UGBs of the two amplifiers may be 5 MHz and 6 MHz, respectively. This allows the PSRR to be effectively improved by the CFFRC technique. In addition, when a frequency of input noise is out of the UGB of the LDO, a feed-forward capacitor is the only path through which an input ripple can be coupled to the gate of the pass transistor. Here, the PSRR may also be improved by the CFFRC circuit. FIGS. 7A-7B shows simulation results when a load current is 10 mA and a load current is 200 mA with respect to an LDO with and without the CFFRC circuit according to an embodiment of the present invention ($I_L$=10 mA on the left, and $I_L$=200 mA on the right). It can be seen from FIGS. 7A-7B that the PSRR is improved up to a wide bandwidth of 1 MHz or more. The PSRR is improved by up to a maximum of 30 dB at the 10 mA load current. However, the degree of improvement decreases at the 200 mA load current. This is because an operation region of the pass transistor changes from a saturation region to a triode region as the load current increases. The back-to-back pseudo-resistor and the feedback capacitor each serve as a high-pass filter. Thus, the PSRR starts to improve at a frequency of about 1 Hz. When a frequency is higher than a cutoff frequency, the input ripple may pass through the feed-forward path. That is, when a frequency of power supply noise is higher than a cutoff frequency of the high-pass filter, the power supply noise may pass through the feed-forward path. As can be seen from FIGS. 7A-7B, the PSRR starts to improve at a frequency of around 1 Hz. The cutoff frequency of the high-pass filter may be expressed as follows.

$$f_{outoff} = \frac{1}{2\pi C_{ff2}R_{b1}} \text{ or } \frac{1}{2\pi C_{s2}R_{b2}} \quad \text{[Equation 8]}$$

In the present invention, capacitance of each capacitor used in the feed-forward path may be, for example, 1 pF. Since $R_{b1}$ and $R_{b2}$ are each implemented as a diode-connected MOS transistor, resistance changes according to the load current due to a voltage difference between both ends of the back-to-back pseudo-resistor. Therefore, the two cutoff frequencies of FIGS. 7A-7B are different from each other and are positioned in the range of 1 Hz to several Hz. Here, the PSRR is not improved from a DC frequency to the cutoff frequency. Although the cutoff frequency increases the capacitance of each capacitor used in the feed-forward path to be closer to the DC frequency, the capacitor reduces the UGBs of the feed-forward amplifier FFA and the summing amplifier SA. Therefore, for considering the UGB and finding the cutoff frequency at a low frequency, the capacitance of 1 pF may be selected in the present invention.

Hereinafter, simulation results according to an embodiment of the present invention will be described.

A. Implementation of LDO with Low Quiescent Current

Figure 8:
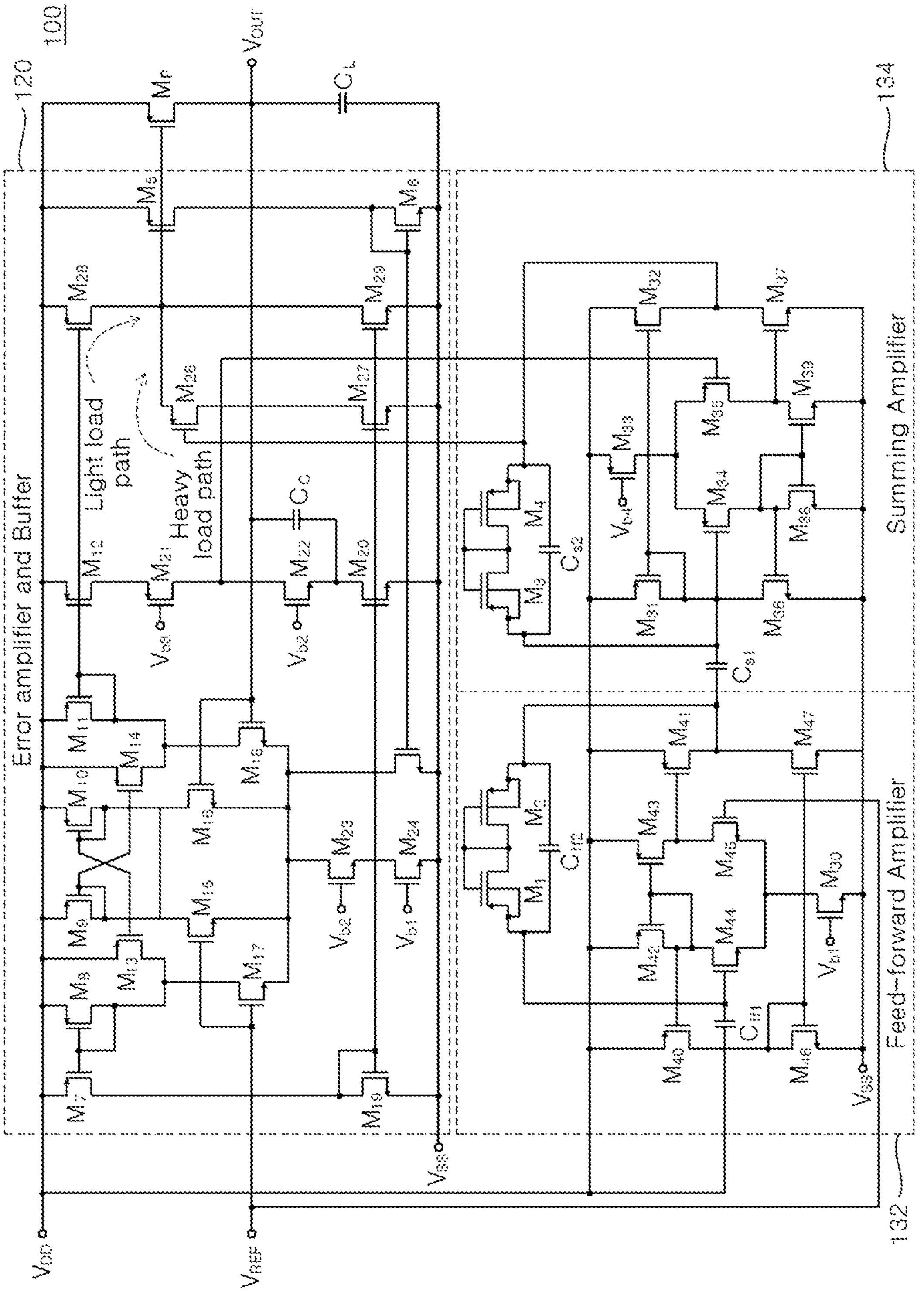
FIG. 8 is a diagram illustrating a circuit implementation of the LDO according to an embodiment of the present invention.

The LDO regulator using the CFFRC technique according to an embodiment of the present invention is shown in FIG. 8. gm is improved by $M_{13}$, $M_{14}$, and a dynamic bias of $M_{25}$. In this circuit, $M_{13}$ and $M_{14}$ increase to four times the transconductance of an operational transconductance amplifier (OTA). In order to drive a large load current, a current buffer of $M_{26}$ is implemented with a wide width of 40 μm. Therefore, $M_{26}$ operates as a weak reverse transistor due to a low bias current in a low load current condition. In order to secure stability in this state, additional output stages of $M_{28}$ and $M_{29}$ are used parallel to the current buffer. A current ratio of $M_{28}$, $M_{26}$, and $M_{29}$ is 3:1:2. Output impedance of the gate of $M_P$ is ro29//ro28//1/gm26. When the load current is low, the output impedance of the gate of $M_P$ is ro29//ro28. When the load current increases, an adaptive bias technology provides more current to the current buffer. The output impedance of the gate of $M_P$ is 1/gm26. Therefore, the stability is secured with this impedance configuration.

As shown in FIG. 8, the feed-forward amplifier FFA and the summing amplifier SA are each implemented by the existing OTA. An N-type MOSFET and a P-type MOSFET are employed as an input metal oxide semiconductor field effect transistor (MOSFET) of the feed-forward amplifier FFA and an input MOSFET of the summing amplifier SA, respectively, to match input and output swing ranges of the error amplifier EA, the feed-forward amplifier FFA, and the summing amplifier SA.

As described above, the DC bias of the feed-forward path is achieved by the back-to-back pseudo-resistor. In order to process the voltage of Equation 3, an N-type input pair and a P-type input pair are used in the feed-forward amplifier FFA and the summing amplifier SA, respectively. Therefore, the design of the input and output swings of the error amplifier EA, the feed-forward amplifier FFA, and the summing amplifier SA is simplified more. The following table 1 shows simulation results of quiescent currents, and the total IQ of the LDO according to an embodiment of the present invention is calculated as 0.9 μA.

TABLE 1

| Component | Current (nA) |
|---|---|
| FFA | 100 |
| SA | 100 |
| $M_{13}$, $M_{14}$ | 100 |
| $M_8$, $M_{11}$ | 100 |
| $M_7$, $M_{12}$ | 25 |
| $M_9$, $M_{10}$ | 25 |
| $M_{28}$ | 150 |
| $M_P$ | 50 |
| Total | 900 |

B. Stability Analysis

Stability analysis may be divided into two stages: a light load condition and a heavy load condition. In the light load condition, the output impedance of the gate of the pass transistor $M_P$ is ro29//ro28. Here, $M_{28}$ and $M_{29}$ mainly drive the pass transistor $M_P$.

Figure 9:
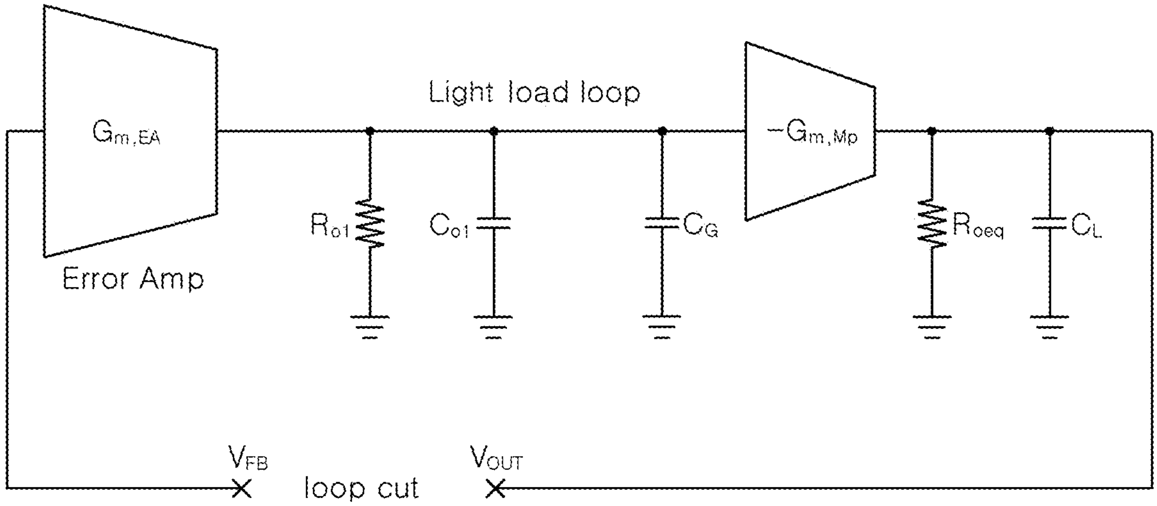
FIG. 9 is a diagram illustrating a small signal block diagram of the LDO in a light load condition according to an embodiment of the present invention.

FIG. 9 is a simplified small signal block diagram of the LDO in the light load condition. Here, $G_{m,EA}$ and $G_{m,Mp}$ denote transconductance of the error amplifier EA and transconductance of the pass transistor $M_P$, respectively. $R_{o1}$ and $C_{o1}$ denote output impedance and a parasitic capacitor at a drain of $M_{28}$, respectively. $C_G$ denotes a parasitic capacitor at the gate of the pass transistor $M_P$. $R_{oeq}$ and $C_L$ denote equivalent output impedance and an output capacitor of the pass transistor $M_P$, respectively. Since a size of the pass transistor $M_P$ is large ($C_G >> C_{o1}$), a loop transfer function may be expressed as follows.

$$T(s) = \frac{-G_{m,EA}G_{m,Mp}R_{o1}R_{oeq}}{1 + R_{oeq}C_L s + C_G C_L R_{oeq} R_{o1} s^2} \quad \text{[Equation 9]}$$

Two poles are present in Equation 9.

$$\omega_{p1} = \frac{1}{R_{oeq}C_L},\ \omega_{p2} = \frac{1}{C_G r_{o1}} \quad \text{[Equation 10]}$$

Figure 10A:
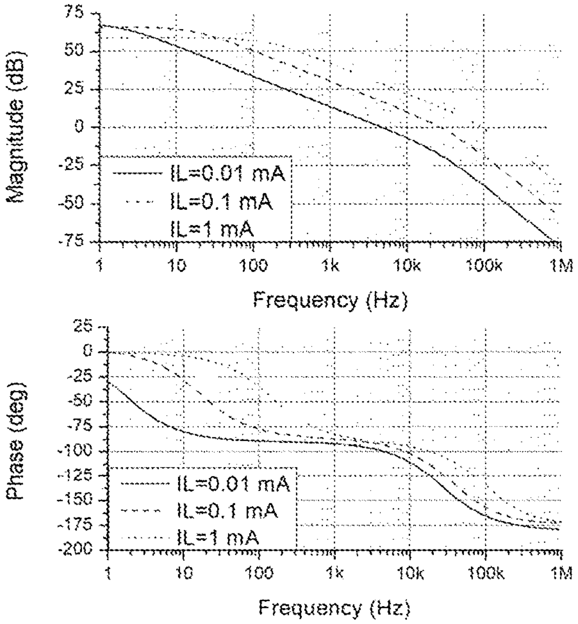
FIGS. 10A-10D are diagrams illustrating simulated frequency responses in various load conditions according to an embodiment of the present invention.

Due to the low load current, the high output resistance and large output capacitor of the LDO cause a very low frequency pole. The system may be stabilized as a one-pole system with $\omega_{p2} >> \omega_{p1}$. FIG. 10A shows simulation results of frequency responses together with phase margins of 81°, 54°, and 47° at load currents of 10 μA, 100 μA, and 1 mA.

Figure 11:
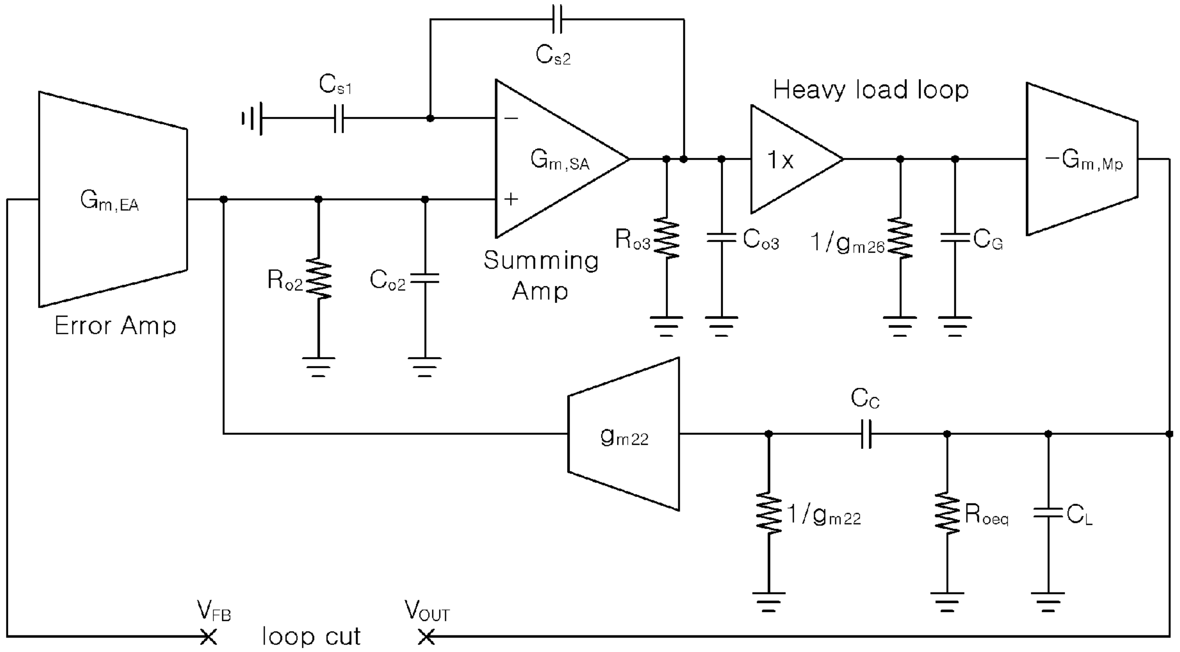
FIG. 11 is a diagram illustrating a small signal block diagram of the LDO in a heavy load condition according to an embodiment of the present invention.

As the load current increases to 1 mA, the current buffer enters a saturation region due to an increased adaptive bias current. The output impedance of the gate of the pass transistor $M_P$ is 1/gm26, and the current buffer mainly drives the pass transistor $M_P$. FIG. 11 is a simplified small signal block diagram of the LDO in the heavy load condition. $R_{o2}$ and $R_{o3}$, and $C_{o2}$ and $C_{o3}$ denote output impedance and parasitic capacitors at drains of $M_{21}$ and $M_{32}$, respectively. $G_{m,SA}$ denotes transconductance of the summing amplifier SA. The feed-forward amplifier FFA may be considered as a virtual ground during stability analysis. A small signal model of the feed-forward amplifier FFA is not included in FIG. 11. Due to large resistance of the back-to-back pseudo-resistor, the small signal model may be considered an open circuit. In the heavy load mode, a transfer function of a compensation capacitor $C_C$ may be approximated as follows.

$$T(s) \cong \frac{-2G_{m,Mp}G_{m,EA}R_{o2}R_{oeq} \times \left(1 + \frac{sC_C}{g_{m22}}\right)}{1 + 2C_C G_{m,Mp} R_{o2} R_{oeq} s + C_{o2} C_L R_{o2} R_{oeq} s^2 + \frac{C_{o2}C_L C_C R_{o2} R_{oeq}}{g_{m22}} s^3 + \frac{C_{o2} C_L C_s C_C R_{o2} R_{oeq}}{g_{m22} G_{m,SA}} s^4} \quad \text{[Equation 11]}$$

In Equation 11, since $C_{s1}$ and $C_{s2}$ have the same value in circuit design, $C_{s1}$ and $C_{s2}$ are replaced with $C_s$. Four poles (one dominant pole and three non-dominant poles) and one zero point are present.

$$\omega_{p1} = \frac{1}{C_C G_{m,Mp} R_{o2} R_{oeq}}, \quad \text{[Equation 11]}$$

$$\omega_{p2} = \frac{C_C G_{m,Mp}}{C_{o2} C_L},$$

$$\omega_{p3} = \frac{g_{m22}}{C_C},$$

$$\omega_{p4} = \frac{G_{m,SA}}{C_s},$$

$$\omega_z = \frac{g_{m22}}{C_C}.$$

Figure 10B:
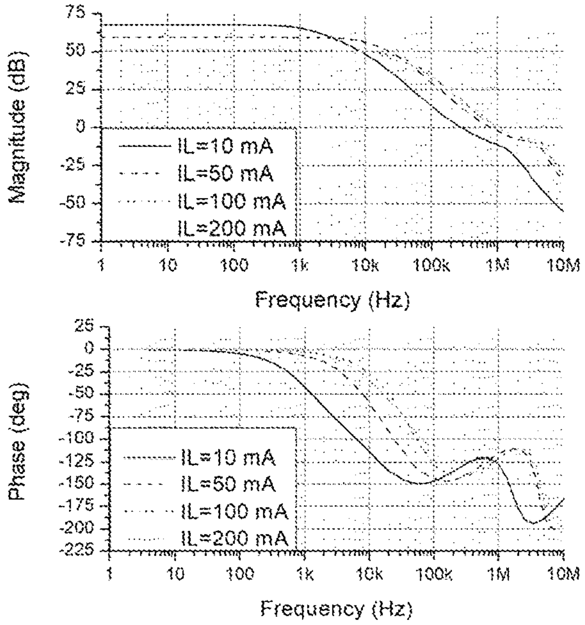
Figure 10C:
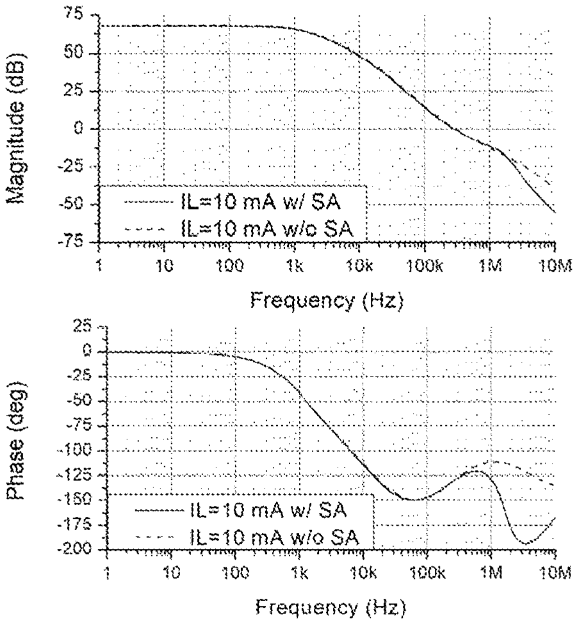

A dominant pole is $\omega_{p1}$. The zero point is generated by $C_C$ having capacitance of 18 pF and automatically offsets $\omega_{p3}$ ($\omega_z = \omega_{p3} = g_{m22}/C_C$). A sufficient phase margin may be obtained through the current buffer compensation. Although compensation of the phase margin is possible by increasing $C_C$, transient response performance may be degraded due to the large capacitance. A first non-dominant pole $\omega_{p2}$ is shifted to a higher frequency as the load current increases. This means that the phase margin and stability of the LDO are improved in the heavy load condition. A loop gain transfer function shows that the LDO is a second-order system. A simulated frequency response of the proposed LDO in a harsh condition is shown in FIG. 10B. Phase margins are 56°, 61°, 60°, and 55° at load currents of 10 mA, 50 mA, 100 mA, and 200 mA, respectively. In addition, FIG. 10C shows frequency responses at a 10 mA load current with and without the summing amplifier SA. Here, a pole of $\omega_{p4}$ generated by the summing amplifier SA is positioned out of the UGB.

Figure 10D:
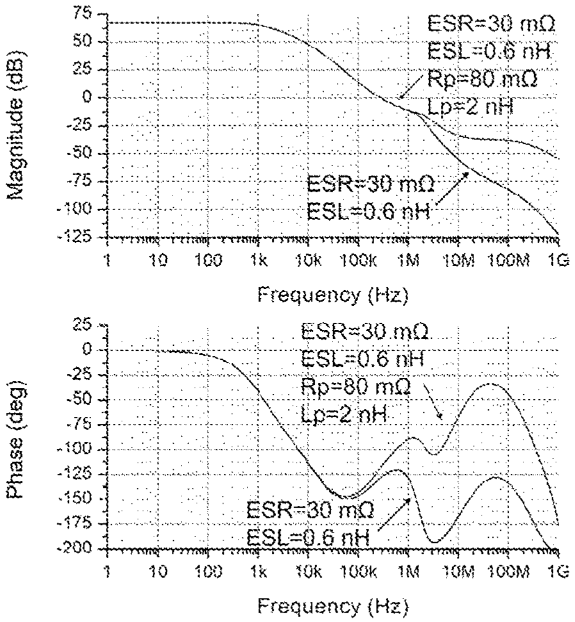

In addition, since this circuit employs a 1 μF off-chip capacitor, equivalent series resistance (ESR=30 mΩ) and equivalent series inductance (ESL=0.6 nH) of the capacitor are included in the frequency response simulation. As can be seen from FIG. 10D, two zero points are present when the phase drops to −150°. The two zero points are generated by ESR and ESL. FIG. 10D shows frequency responses when parasitic components of a bonding wire (RP=80 mΩ and LP=2 nH) are included for simulation. The phase margin does not significantly change as shown in the drawing, and a similar phase shift due to inductance can be seen in other LDOs including parasitic components.

Figure 12:
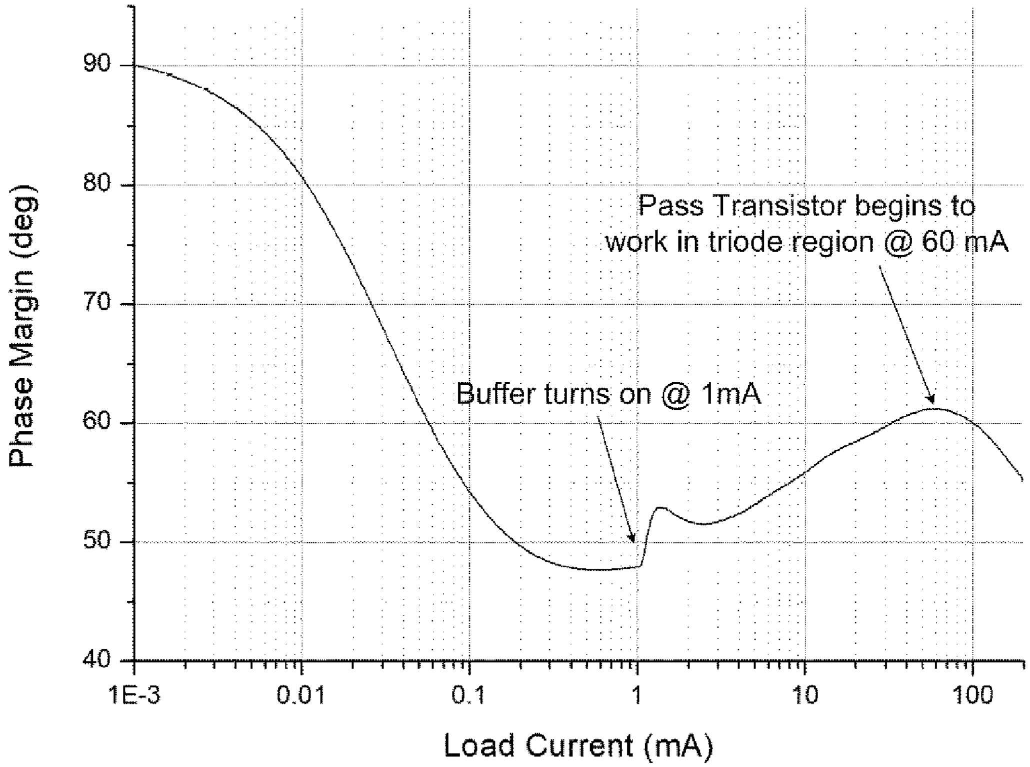
FIG. 12 is a diagram illustrating a simulated phase margin according to an increase in load current according to an embodiment of the present invention.

FIG. 12 shows a change of the phase margin according to the load current. A feedback loop is changed due to a buffer state change of about 1 mA. The lowest phase margin is positioned at a boundary between a light load mode and a heavy load mode. When the pass transistor enters a triode region, the phase margin begins to drop.

Figure 13A:
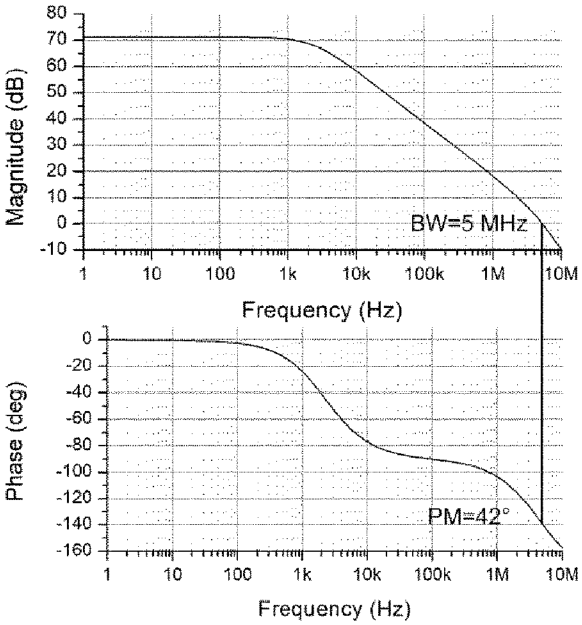
FIGS. 13A-13B are diagrams illustrating simulated frequency responses of the FFA (left) and the SA (right) according to an embodiment of the present invention.
Figure 13B:
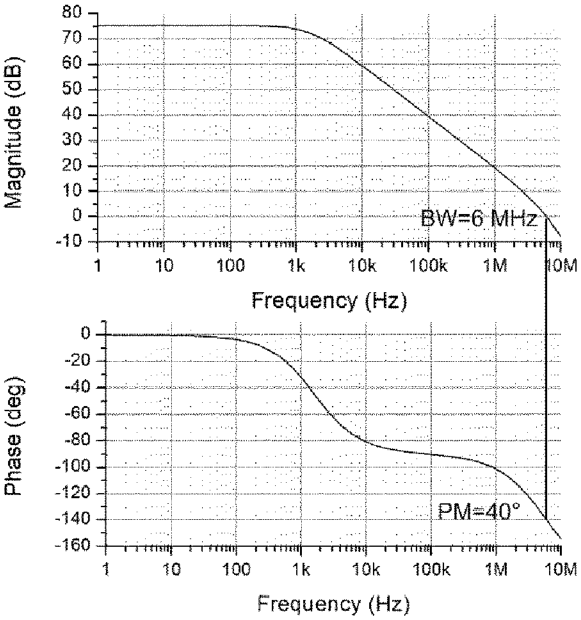

Frequency responses of the feed-forward amplifier FFA and the summing amplifier SA are shown in FIGS. 13A-13B. Since a selected 1 pF feed-forward capacitor is sufficiently large to form a dominant pole at an output of a two-stage amplifier, common Miller compensation is not used. When Miller compensation is used, poles at drain nodes of $M_{39}/M_{43}$ and $M_{32}/M_{41}$ are shifted closer to each other. A large phase margin may be obtained by compensating the OTA using a large Miller capacitor. Here, a dominant pole is positioned at an output of a first stage. However, a UGB of the OTA may be significantly narrowed. Therefore, efficient frequency compensation for a wide bandwidth is another important factor to consider when determining a value of the feed-forward capacitor.

Figure 14A:
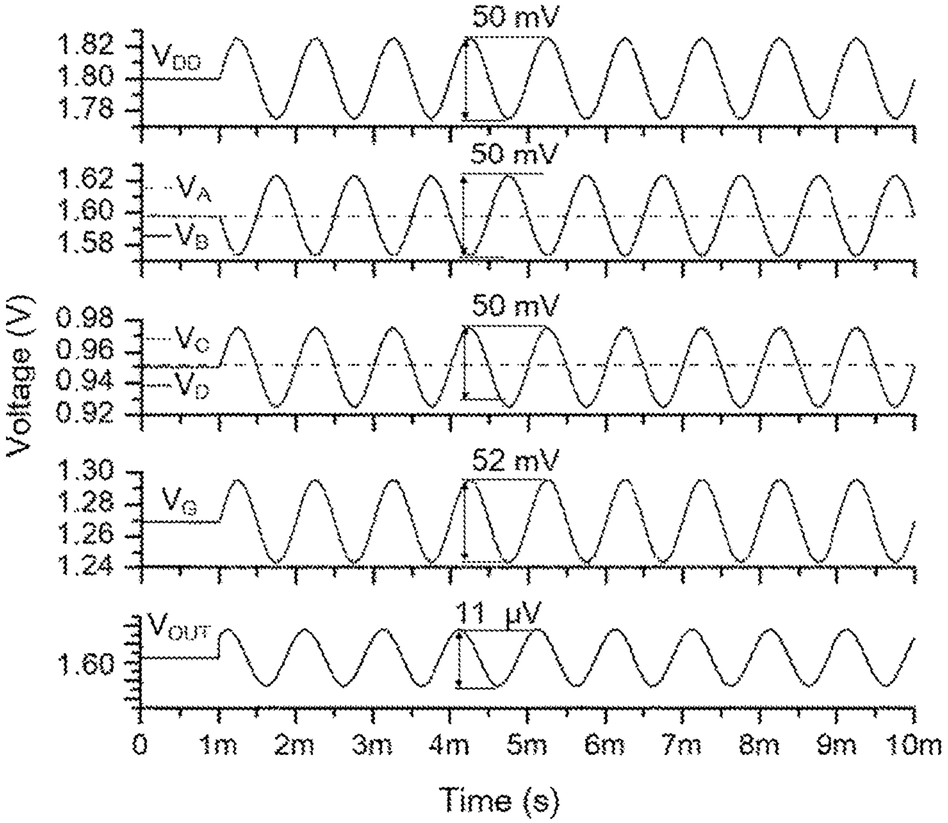
FIGS. 14A-14B are diagrams illustrating simulated transient results of a 50 mV peak-to-peak input ripple at $I_L$=10 mA according to an embodiment of the present invention.
Figure 14B:
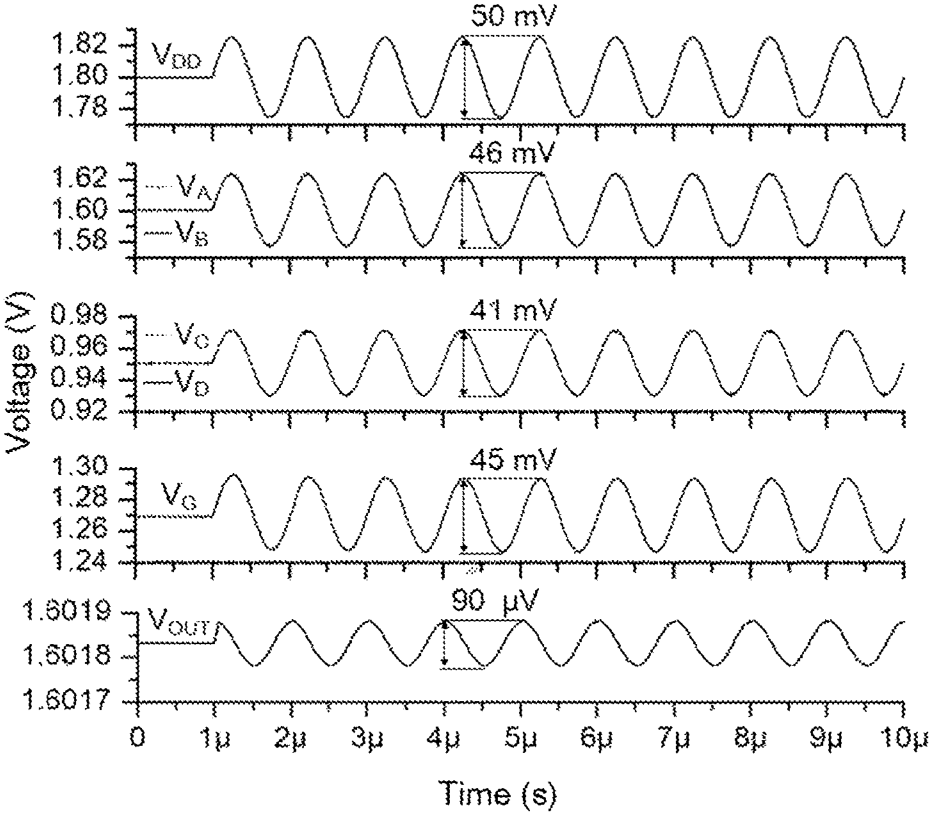

FIGS. 14A-14B shows transient results simulated with a 50-mV peak-to-peak input ripple at a 10-mA load current. As shown in FIG. 14A, when a frequency of the input ripple is 1 kHz, points A and C maintain a virtual ground level, and the input ripple is traced to the gate of the pass transistor. When the frequency of the input ripple increases to 1 MHz, the feed-forward amplifier FFA, the summing amplifier SA, and the error amplifier EA each have a low gain and weak feedback in a high frequency region (out of the UGB of the LDO). When the amplifier does not operate normally due to the low gain at a high frequency, the virtual ground level is not maintained. The feed-forward capacitor is the only path through which the input ripple can be coupled to the gate of the pass transistor. As shown in FIG. 14B, the high frequency input ripple may be tracked by $C_{ff1}$, $C_{ff2}$, and $C_{S1}$, and $C_{S2}$.

Figure 15:
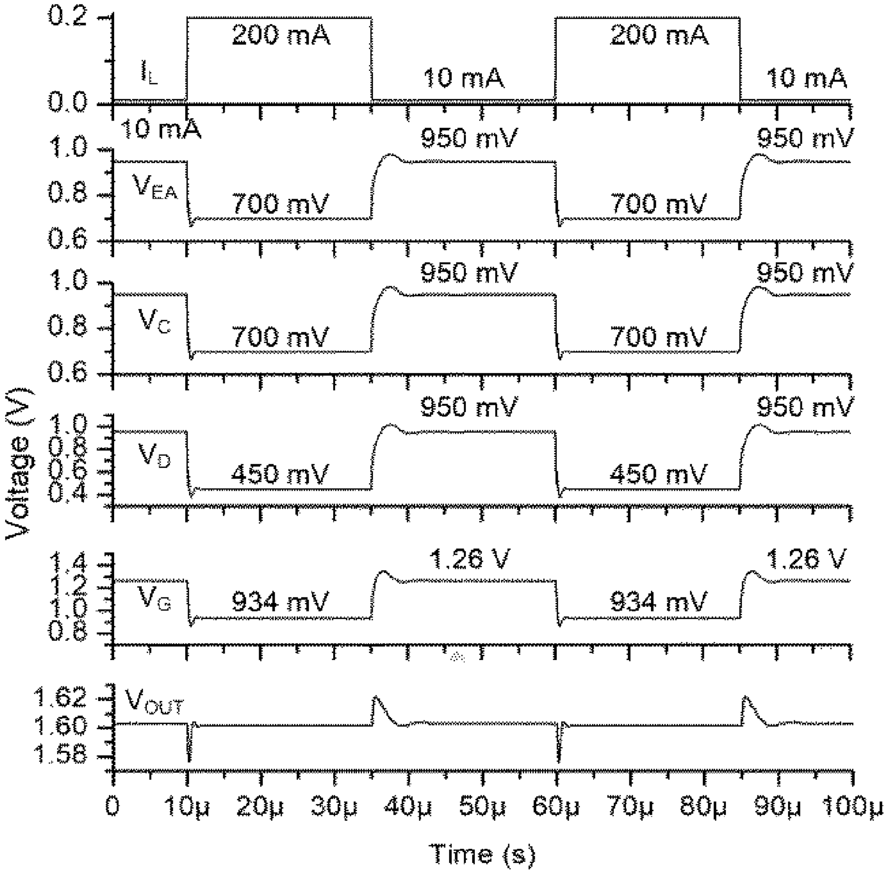
FIG. 15 is a diagram illustrating simulated transient results of frequent load stages according to an embodiment of the present invention.

Simulated transient responses of voltage changes according to frequent load steps are shown in FIG. 15. When there is a high-frequency input signal (a 100 ns rising/falling time), the capacitor has very low impedance and a voltage $V_C$ quickly tracks $V_{EA}$. The load transient response is sufficiently fast and is not affected by many back-to-back resistors.

Test Results

Figure 16:
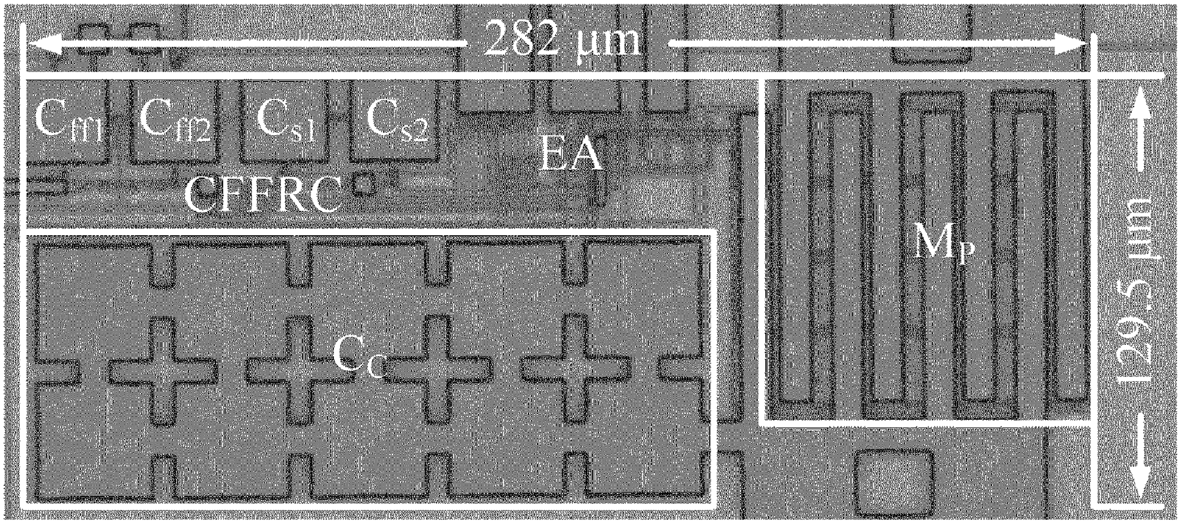
FIG. 16 is a diagram illustrating a chip micrograph of the LDO according to an embodiment of the present invention.

A prototype chip was manufactured using a 0.18-μm complementary metal-oxide semiconductor (CMOS) technology together with a 1.8-V power supply device. As can be seen from FIG. 16, a chip area of an active core is 0.037 $mm^2$. The overall LDO consumes a quiescent current of 0.9 μA. The LDO has a dropout voltage of 200 mV, and a maximum load current of 200 mA.

Figure 17:
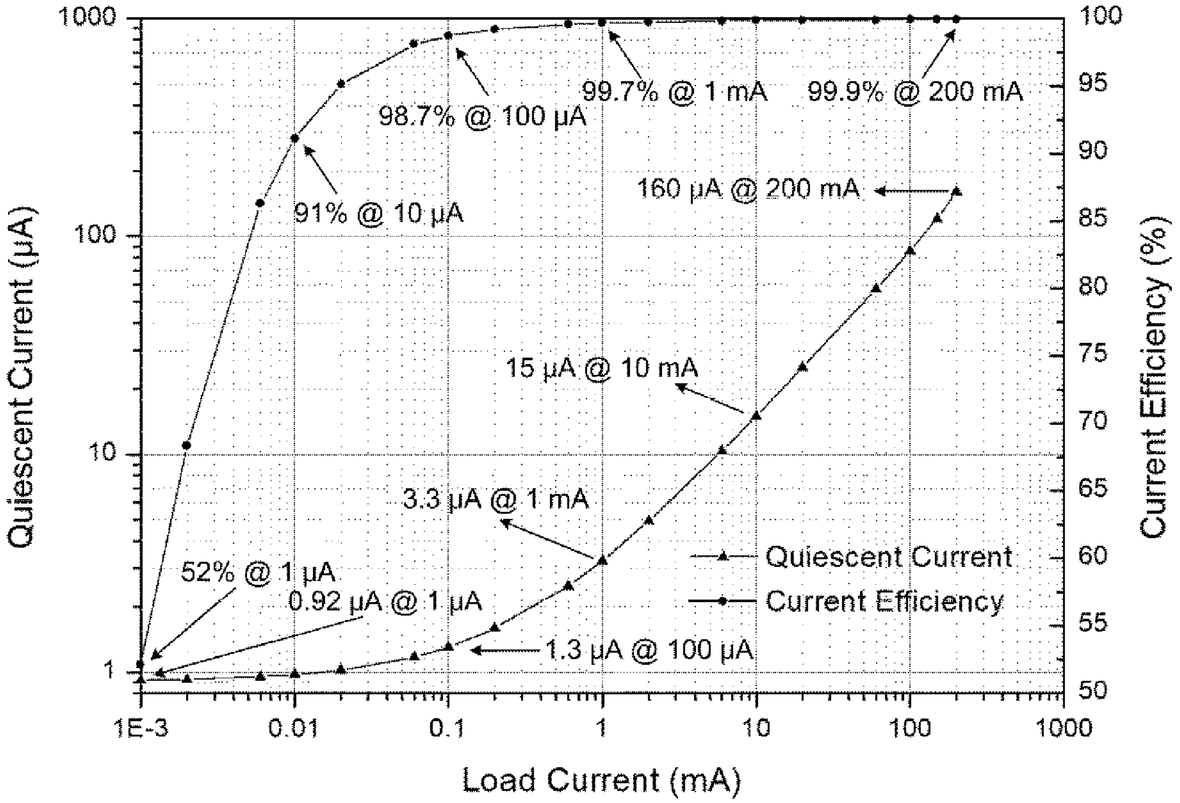
FIG. 17 is a diagram illustrating a measured quiescent current and measured current efficiency of an LDO regulator according to an embodiment of the present invention.

FIG. 17 shows the measured quiescent current and current efficiency of the proposed LDO. As the load current changes from 1 μA to 200 mA, the total quiescent current varies from 0.92 μA to 160 μA. The current efficiency is 52% at 1 μA, and peak current efficiency is 99.9% at 200 mA.

Figure 18A:
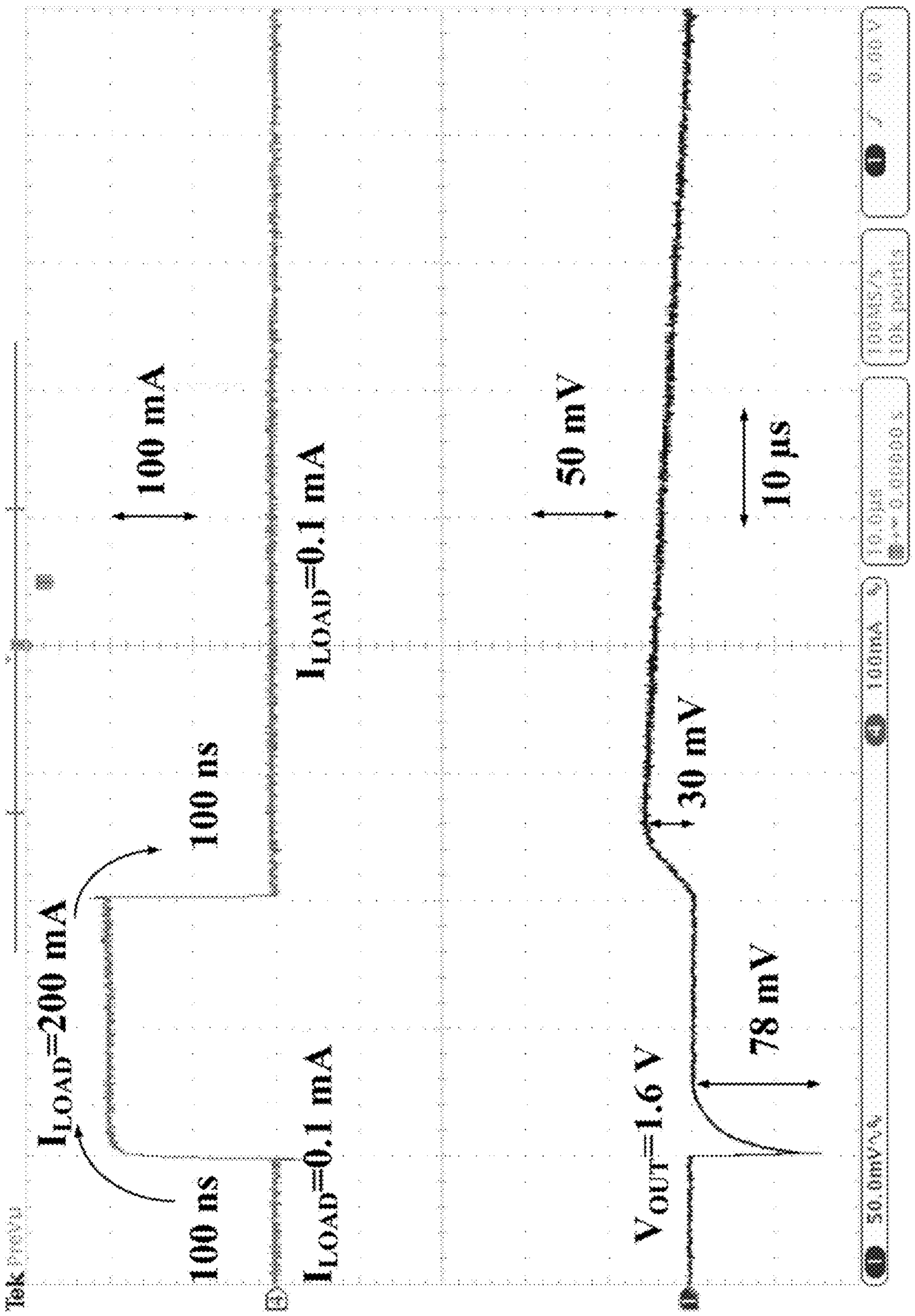
Figure 18B:
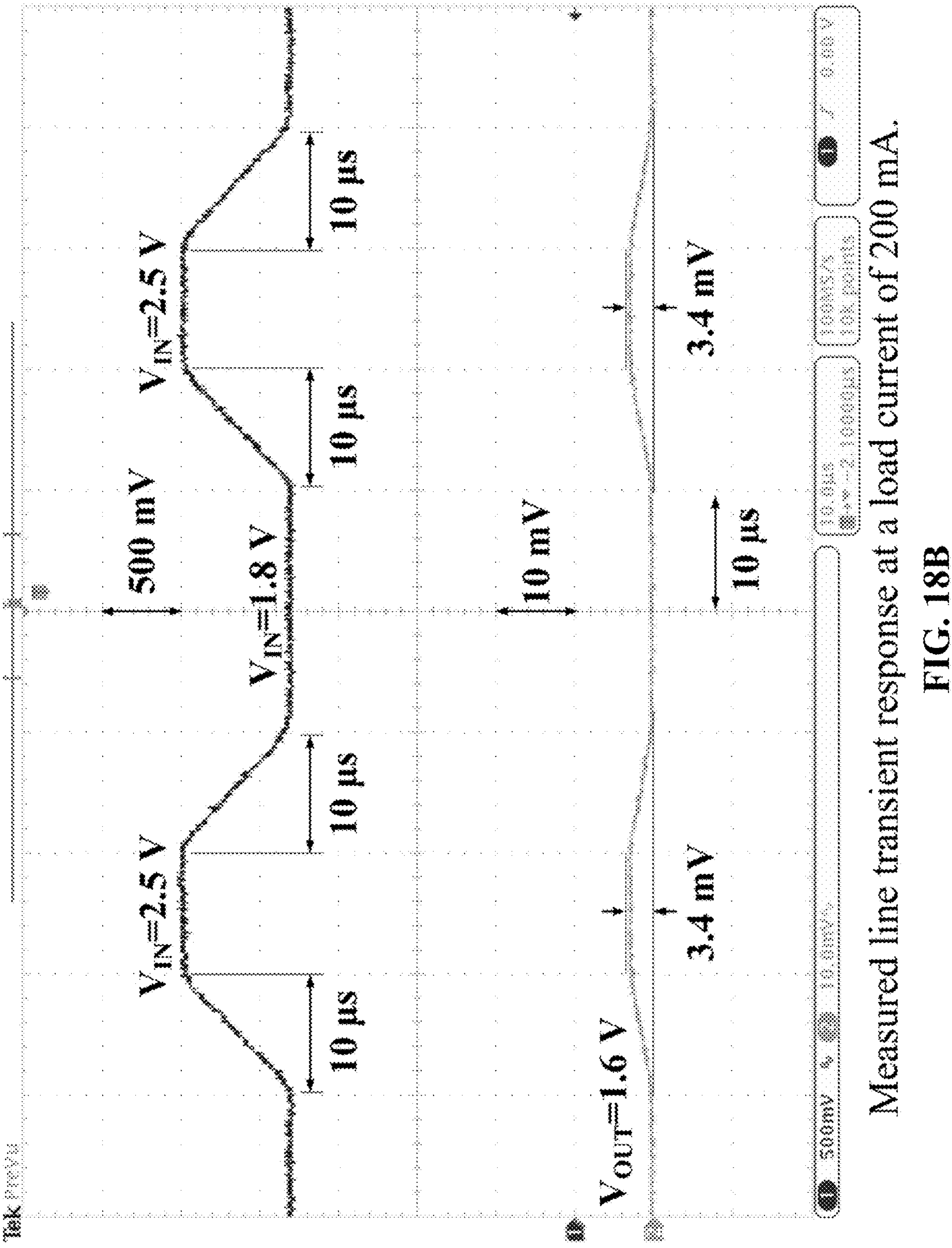

The measured result of the load transient response is shown in FIG. 18A. A maximum undershoot and a maximum overshoot are 70 mV and 30 mV, respectively, in load current steps ranging from 100 μA to 200 mA at a 100 ns rising/falling time. As shown in FIG. 18A, when the output capacitor is large, the response becomes slow when the load current decreases. Due to the low current, a large off-chip capacitor takes a long time to be discharged. FIG. 18B shows measured line transient responses when a supply voltage with a 10 μs rising/falling time changes from 1.8 V to 2.5 V. An output fluctuation is 3.4 mV at the 200 mA load current. A measured load regulation and a measured line regulation are 0.055 mV/mA with a load differential of 200 mA and 4.86 mV/V with a voltage difference of 0.7 V, respectively.

Figure 19A:
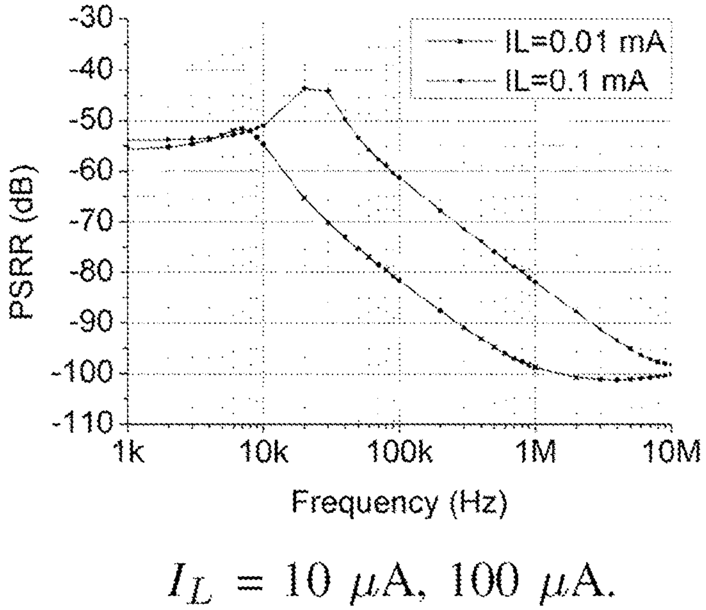
Figure 19B:
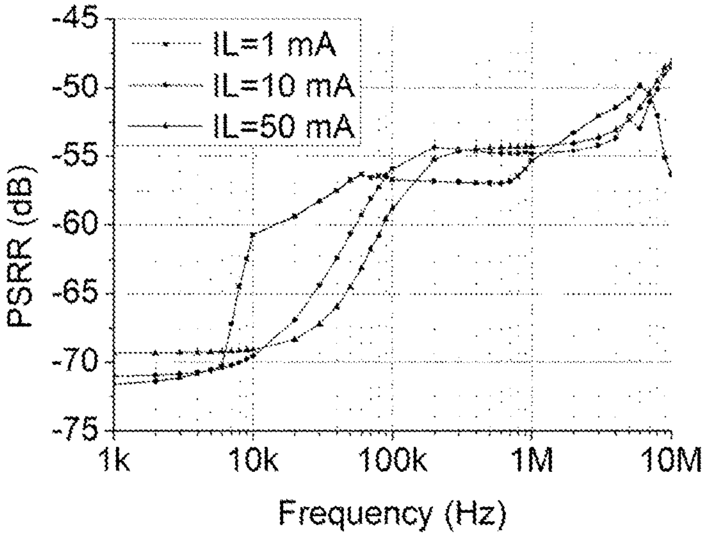
Figure 19C:
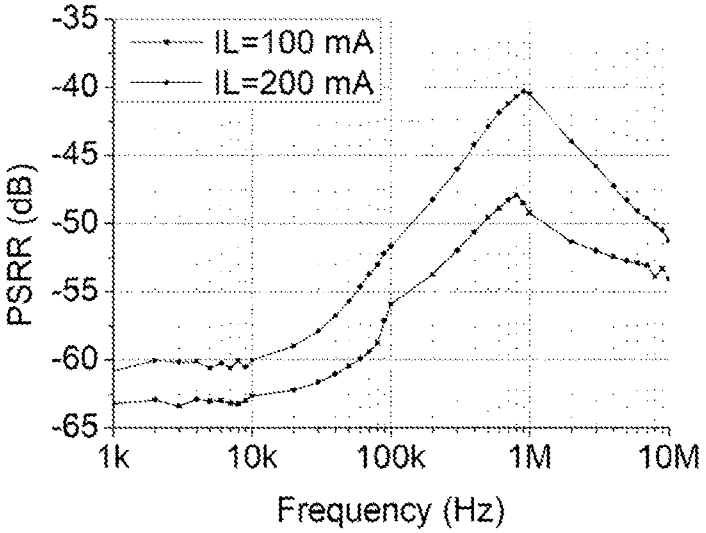

FIGS. 19A-19D shows test results of PSRR in various load conditions with a 10-mV input ripple. PSRR performance may be proved in three conditions:

1) When the load current is low, the LDO is a single pole system with a dominant pole positioned at an extremely low frequency. FIG. 19A shows PSRRs at load currents of 10 μA and 100 μA. A minimum value of the PSRR is −43 dB.
2) When the load current increases, the current buffer enters the saturation region. The CFFRC circuit improves the PSRR significantly. The PSRRs at load currents of 1 mA, 10 mA, and 50 mA are shown in FIG. 19B, and a minimum PSRR is greater than −48 dB up to a 10 MHz frequency.
3) When the load current is 100 mA, an operating state of the pass transistor $M_P$ changes from a saturation region to a triode region. The PSRR has a weak aspect at a high frequency. As shown in FIG. 19C, the PSRR has a minimum value at the 200-mA load current and a 1-MHz frequency. However, the PSRR is still greater than or equal to −40.5 dB at a frequency of about 1 MHz.

Figure 19D:
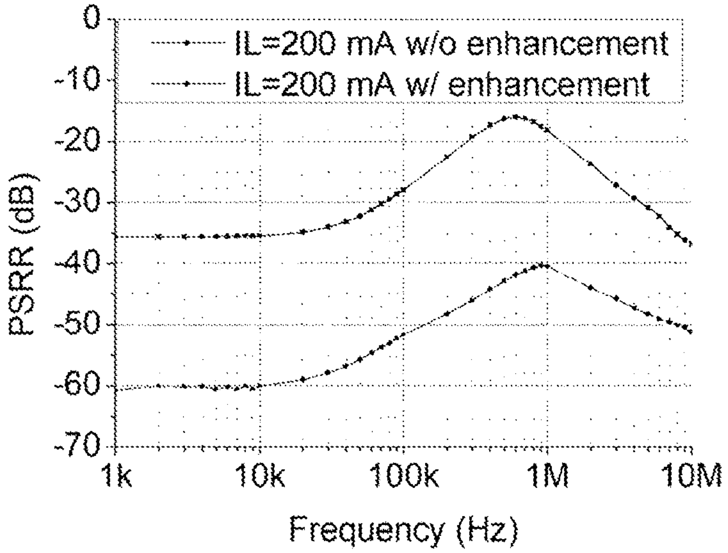

Two LDOs were formed in the chip. One is the proposed LDO and the other is the same LDO but with a deactivated PSRR enhancer. The two LDOs were measured and compared. FIG. 19D shows the comparison of the PSRRs with and without the PSRR enhancer at the 200 mA load current. This shows that the PSRR is well enhanced to the 1 MHz frequency at low frequencies. FIG. 19 shows that the proposed circuit has excellent PSRR performance in a wide frequency and load range.

Conclusion

In the present invention, a PSRR enhancement technique using a low quiescent current CFFRC technique is proposed. This technique uses capacitors and back-to-back resistors in the CFFRC loop for low quiescent current DC biasing. This design may remove the input ripple appearing at the output with consumption of only a 200 nA additional quiescent current in the PSRR enhancement circuit. The test results confirmed the operation of the circuit in the wide range of load currents and frequencies. The proposed LDO regulator consumes only 0.9 μA quiescent current. Compared to the LDO without the proposed CFFRC technique, the PSRR performance is enhanced by −22 dB at the 1 MHz frequency.

In the above-described circuit according to the embodiments of the present invention, in order to remove power supply noise from the LDO, the resistors of the feed-forward amplifier FFA and the summing amplifier SA are replaced with the capacitors. In this case, the pseudo-resistor is applied to define a bias point, and in order to solve the problem in which the feed-forward amplifier FFA cannot be biased in an appropriate operating condition, $V_{bias}$ is used as the reference voltage of the LDO in the CFFRC. The circuit according to the embodiments of the present invention may be used in a low-dropout regulator requiring low power consumption and high PSRR in an energy harvesting system and a low-power sensor. In addition, the circuit according to the embodiments of the present invention may be used in voltage regulators among various power management integrated circuits for receiving power from batteries, such as smart watches and Internet of things (IoT) devices where battery efficiency is important.

The term "part" used in the present specification may refer to a unit including one or a combination of two or more of, for example, hardware, software, and firmware. "Part" can be interchangeably used with terms such as, for example, "module," "unit," "logic," "logical block," "component," or "circuit." A "part" may be a minimum unit of an integrally constituted part or a portion thereof. A "part" may be a minimum unit or a portion thereof that performs one or more functions. A "part" may be implemented mechanically or electronically. For example, a "part" may include at least one among an application-specific integrated circuit (ASIC) chip, which performs certain operations that are known or to be developed, field-programmable gate arrays (FPGAs), and a programmable-logic device.

At least some devices (e.g., modules or functions thereof) or methods (e.g., operations) according to various embodiments of the present invention can be implemented as commands stored in the form of program modules in, for example, computer-readable storage media. When the commands are executed by, for example, a processor, one or more processors may perform a function corresponding to the commands. A computer-readable storage medium may be, for example, a memory.

Computer-readable recording media may include hard disks, floppy disks, magnetic media (e.g., a magnetic tape), optical media (e.g., a compact disc read only memory (CD-ROM), a digital versatile disc (DVD), and magneto-optical media (e.g., a floptical disk), hardware devices (e.g., a ROM, a random access memory (RAM), and flash memory), and the like. In addition, examples of the program commands may include machine language codes generated by a compiler, as well as high-level language codes which are executable by a computer using an interpreter or the like. The above-described hardware devices may be configured to operate as one or more software modules to perform operations of various embodiments, and vice versa.

A module or a program module according to various embodiments may include one or more among the above-described components, some may be omitted, or additional components may be further included. Operations performed by modules, program modules, or other components according to various embodiments may be executed in a sequential, parallel, repetitive, or heuristic manner. Also, some operations may be performed in a different order or omitted, or other operations may be added.

In accordance with the present invention, a circuit capable of removing power supply noise while consuming a low quiescent current through a capacitive feed-forward ripple cancellation (FFRC) technique can be provided.

Further, in accordance with the present invention, it is possible to enable low-power design using feed-forward capacitors and back-to-back pseudo-resistors.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A voltage regulator comprising:

a pass unit configured to transfer, in response to a control signal, an input voltage provided from an input terminal to an output voltage of an output terminal;

an error amplification unit configured to output a comparison signal on the basis of a magnitude comparison result between the output voltage and a reference voltage; and a feed-forward ripple cancellation unit configured to remove a ripple included in the input voltage using the reference voltage and the comparison signal in order to generate the control signal, wherein the feed-forward ripple cancellation unit includes a feed-forward amplifier and a summing amplifier, wherein the feed-forward ripple cancellation unit includes:

a first capacitor having one end connected to the input terminal and another end connected to a negative input terminal of the feed-forward amplifier;

a second capacitor having one end connected to the negative input terminal of the feed-forward amplifier and another end connected to an output terminal of the feed-forward amplifier;

a third capacitor having one end connected to the output terminal of the feed-forward amplifier and another end connected to a negative input terminal of the summing amplifier; and a fourth capacitor having one end connected to the negative input terminal of the summing amplifier and another end connected to an output terminal of the summing amplifier.

2. The voltage regulator of claim 1, wherein the feed-forward ripple cancellation unit includes:

a first resistor connected to the second capacitor in parallel between the negative input terminal of the feed-forward amplifier and the output terminal of the feed-forward amplifier; and a second resistor connected to the fourth capacitor in parallel between the negative input terminal of the summing amplifier and the output terminal of the summing amplifier.

3. The voltage regulator of claim 2, wherein a positive input terminal of the feed-forward amplifier is connected to a negative input terminal of the error amplification unit.

4. The voltage regulator of claim 2, wherein a positive input terminal of the summing amplifier is connected to an output terminal of the error amplification unit.

5. The voltage regulator of claim 2, wherein at least one of the first resistor and the second resistor includes a pseudo-resistor.

6. The voltage regulator of claim 5, wherein:

the pseudo-resistor includes a first transistor and a second transistor;

a drain of the first transistor and a drain of the second transistor are connected to each other through a common node; and a gate of the first transistor and a gate of the second transistor are connected to each other through the common node.

* * * * *